US006434684B1

United States Patent
Manning

(10) Patent No.: US 6,434,684 B1
(45) Date of Patent: Aug. 13, 2002

(54) METHOD AND APPARATUS FOR COUPLING SIGNALS ACROSS DIFFERENT CLOCK DOMAINS, AND MEMORY DEVICE AND COMPUTER SYSTEM USING SAME

(75) Inventor: Troy A. Manning, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/146,946

(22) Filed: Sep. 3, 1998

(51) Int. Cl.[7] .......................... G06F 12/00; G06F 1/12; G06F 5/00; G06F 1/04; G11C 8/00
(52) U.S. Cl. .................. 711/167; 711/105; 713/400; 713/401; 713/503; 713/500; 713/501; 713/601; 365/233
(58) Field of Search .............................. 713/400, 401, 713/503, 500, 501, 601; 711/105, 167; 365/233

(56) References Cited

U.S. PATENT DOCUMENTS

| | | | | |
|---|---|---|---|---|
| 4,873,703 A | * | 10/1989 | Crandall et al. | 375/118 |
| 5,086,500 A | * | 2/1992 | Greub | 395/550 |
| 5,138,637 A | | 8/1992 | Fox | 375/118 |

(List continued on next page.)

FOREIGN PATENT DOCUMENTS

| | | |
|---|---|---|
| EP | 0 547 768 A2 | 6/1993 |
| EP | 0 678 990 A2 | 10/1995 |
| EP | 0 798 630 A1 | 10/1997 |
| WO | WO 97/06491 | 2/1997 |

OTHER PUBLICATIONS

Descriptive literature entitled, "400MHz SLDRAM, 4M=16 SLDRAM Pipelined, Eight Bank, 2.5 V Operation," SLDRAM Consortium Advance Sheet, published throughout the United States, pp. 1–22.

"Draft Standard for a High–Speed Memory Interface (SyncLink)," Microprocessor and Microcomputer Standards Subcommittee of the IEEE Computer Society, Copyright 1996 by the Institute of Electrical and Electronics Engineers, Inc., New York, NY, pp. 1–56.

Primary Examiner—Do Hyun Yoo
Assistant Examiner—Kimberly McLean
(74) Attorney, Agent, or Firm—Dorsey & Whitney LLP

(57) ABSTRACT

A coupling circuit for coupling a data signal from a first clock domain defined by a first clock signal to a second clock domain defined by a second clock signal. A phase comparator determines whether the first clock signal leads the second clock signal. If so, the data signal is clocked from the first clock domain at a time after a start signal that is later than if the clock signal does not lead the second clock signal. Alternatively, if the first clock signal leads the second clock signal, the data signal may be clocked to the second clock domain at a time after a start signal that is earlier than if the clock signal does not lead the second clock signal.

58 Claims, 9 Drawing Sheets

U.S. PATENT DOCUMENTS

| | | | | |
|---|---|---|---|---|
| 5,179,667 A | * | 1/1993 | Iyer | 395/275 |
| 5,285,483 A | * | 2/1994 | Ogawa et al. | 375/120 |
| 5,448,715 A | * | 9/1995 | Lelm et al. | 395/550 |
| 5,455,935 A | * | 10/1995 | Taylor et al. | 395/550 |
| 5,509,038 A | * | 4/1996 | Wicki | 375/371 |
| 5,548,620 A | * | 8/1996 | Rogers | 375/354 |
| 5,692,166 A | * | 11/1997 | Milhizer et al. | 395/551 |
| 5,754,838 A | * | 5/1998 | Shibata et al. | 395/559 |
| 5,781,765 A | * | 7/1998 | Alexander | 395/551 |
| 5,796,995 A | * | 8/1998 | Nasserbakht et al. | 395/558 |
| 5,828,870 A | * | 10/1998 | Gunadisastra | 395/558 |
| 5,867,695 A | * | 2/1999 | Amini et al. | 395/558 |
| 5,884,099 A | | 3/1999 | Klingelhofer | 395/872 |
| 5,896,347 A | * | 4/1999 | Tomita et al. | 365/233 |
| 5,953,284 A | * | 9/1999 | Baker et al. | 365/233 |
| 5,963,502 A | * | 10/1999 | Watanabe et al. | 365/233 |
| 6,000,022 A | | 12/1999 | Manning | 711/167 |
| 6,003,118 A | * | 12/1999 | Ogawa et al. | 375/120 |
| 6,029,252 A | * | 2/2000 | Manning | 713/556 |
| 6,058,152 A | * | 5/2000 | Tanishima | 375/376 |
| 6,081,142 A | * | 6/2000 | Douchi et al. | 327/158 |
| 6,081,904 A | * | 6/2000 | Chencinski et al. | 713/400 |
| 6,087,867 A | | 7/2000 | Holm | 327/144 |
| 6,097,775 A | * | 8/2000 | Weber | 375/354 |
| 6,112,307 A | * | 8/2000 | Ajanovic et al. | 713/400 |
| 6,163,545 A | | 12/2000 | Flood et al. | 370/465 |
| 6,172,540 B1 | | 1/2001 | Gandhi | 327/145 |

* cited by examiner

METHOD AND APPARATUS FOR COUPLING SIGNALS ACROSS DIFFERENT CLOCK DOMAINS, AND MEMORY DEVICE AND COMPUTER SYSTEM USING SAME

TECHNICAL FIELD

This invention relates to coupling signals from one electronic device or circuit to another, and more particularly to coupling signals between electronic devices or circuits having different clock domains defined by respective clocks that may differ in phase from each other.

BACKGROUND OF THE INVENTION

Many electronic devices operate in a synchronous manner in which the timing of signals in the device are controlled by a clock signal. The transitions of the clock signal occur at substantially the same time throughout the circuit, thereby ensuring that signals coupled or created responsive to the transitions of the clock signal are properly synchronized to each other.

Although synchronism between signals can be maintained when the same clock signal, or clock signals derived from the same clock signal, are used throughout a circuit. It is substantially more difficult to properly synchronize signals coupled from one electronic device to another when the electronic devices operate in different clock domains defined by respective clock signals having phases that may differ from each other in some unpredictable or uncontrolled manner.

One example of an electronic device in which signals must be coupled between circuits operating in different clock domains is a packetized dynamic random access memory ("DRAM"), using Synchronous Link DRAM ("SLDRAM") architecture. An example of a SLDRAM is shown in FIG. 1. With reference to FIG. 1, the SLDRAM 16 includes a clock generator circuit 40 that receives a command clock signal CMDCLK and generates an internal clock signal ICLK, a data clock signal DCLK, a write clock signal WCLK, and a large number of other clock and timing signals to control the timing of various operations in the SLDRAM 16. The SLDRAM 16 also includes a command buffer 46 and an address capture circuit 48, which receive the internal clock signal ICLK, a command packet CA0–CA9 on a 10-bit command bus 50, and a FLAG signal on line 52. A memory controller (not shown) or other device normally transmits the command packet CA0–CA9 to the SLDRAM 16 in synchronism with the command clock signal CMDCLK. The command packet, which generally includes four 10-bit packet words, contains control and address information for each memory transfer. The FLAG signal identifies the start of a command packet, and it also signals the start of an initialization sequence. The command buffer 46 receives the command packet from the bus 50, and compares at least a portion of the command packet to identifying data from an ID register 56 to determine if the command packet is directed to the SLDRAM 16 or another SLDRAM 16. If the command buffer 46 determines that the command packet is directed to the SLDRAM 16, it then provides the command words to a command decoder and sequencer 60. The command decoder and sequencer 60 generates a large number of internal control signals to control the operation of the SLDRAM 16 during a memory transfer.

The phase of the ICLK signal relative to the CMDCLK signal is determined during an initialization procedure. As described more fully in U.S. patent application Ser. No. 08/890,055 to Baker et al, which is incorporated herein by reference, a memory controller (not shown) repeatedly applies packet words to the SLDRAM 16. The memory device attempts to capture these packet words in the command buffer 46 using a variety of different phases of the ICLK signal relative to the phase of the CMDCLK signal received from the memory controller. The memory device then determines which phase of the ICLK signal was best able to capture the packet words, and uses this phase during normal operation of the SLDRAM 16.

The address capture circuit 48 also receives the command words from the command bus 50 and outputs a 20-bit address corresponding to the address information in the command packet. The address is provided to an address sequencer 64, which generates a corresponding 3-bit bank address on bus 66, a 10-bit row address on bus 68, and a 7-bit column address on bus 70. The column address and row address are processed by column and row address paths 73, 75 as will be described below.

One of the problems of conventional DRAMs is their relatively low speed resulting from the time required to precharge and equilibrate circuitry in the DRAM array. The SLDRAM 16 shown in FIG. 1 largely avoids this problem by using a plurality of memory banks 80, in this case eight memory banks 80a–h. After a read from one bank 80a, the bank 80a can be precharged while the remaining banks 80b–h are being accessed. Each of the memory banks 80a–h receives a row address from a respective row latch/decoder/driver 82a–h. All of the row latch/decoder/drivers 82a–h receive the same row address from a predecoder 84 which, in turn, receives a row address from either a row address register 86, redundant row circuit 87, or a refresh counter 88 as determined by a multiplexer 90. However, only one of the row latch/decoder/drivers 82a–h is active at any one time as determined by bank control logic 94 as a function of a bank address from a bank address register 96.

The column address on bus 70 is applied to a column latch/decoder 100, which supplies I/O gating signals to an I/O gating circuit 102. The I/O gating circuit 102 interfaces with columns of the memory banks 80a–h through sense amplifiers 104. Data is coupled to or from the memory banks 80a–h through the sense amplifiers 104 and I/O gating circuit 102 and a data path subsystem 108, which includes a read data path 110 and a write data path 112. The read data path 110 includes a read latch 120 that stores data from the I/O gating circuit 102. In the SLDRAM 16 shown in FIG. 1, 64 bits of data are stored in the read latch 120. The read latch then provides four 16-bit data words to an output multiplexer 122 that sequentially supplies each of the 16-bit data words to a read FIFO buffer 124. Successive 16-bit data words are clocked into the read FIFO buffer 124 by the data clock signal DCLK generated by the clock generator circuit 40. As explained below, the DCLK signal is also coupled to the memory controller or other device that receives the data read from the SLDRAM 16.

The phase of the DCLK signal relative to the CMDCLK signal, like the phase of the ICLK signal, is determined during the initialization procedure. The memory controller (not shown) determines which phase of the DCLK signal will cause the DCLK signal as received by the memory controller to be in phase with the CMDCLK signal that the memory controller applies to the SLDRAM 16. The memory controller then applies a packet to the SLDRAM 16 that causes the clock generator 40 to use the selected phase of the DCLK signal during normal operation of the memory device. As a result, the memory controller can operate in a single clock domain regardless of which of several memory devices it is accessing.

The read FIFO buffer 124 operates in a clock domain corresponding to the DCLK signal. On the other hand, the command buffer 46, the command decoder and sequencer 60, and the memory arrays 80a–h operate in a clock domain corresponding to the ICLK signal. The phase of the DCLK signal relative to the phase of the ICLK signal selected during the initialization procedure will vary in an unpredictable and uncontrollable manner since they will depend upon such factors as signal path lengths and the operating speed of various circuits in the SLDRAM 16 and the memory controller. As a result, the read FIFO buffer 124 operates in a clock domain that is different from the clock domain in which the command buffer 46, the command decoder and sequencer 60, and the memory arrays 80a–h operate.

After each 16-bit word is clock into the read FIFO buffer 124, it is clocked out of the read FIFO buffer 124 by a RCLK clock signal obtained by coupling the DCLK signal through a programmable delay circuit 126. The programmable delay circuit 126 is also programmed during initialization of the memory device. In particular, the memory controller (not shown) programs the delay so that the data read from the SLDRAM 16 is received by the memory controller or other device with a phase at which the DCLK signal is best able to capture the read data at the memory controller. The procedure used is similar to the procedure described above for determining the phase of ICLK except that the determination of the optimum phase of RCLK is determined by the memory controller rather than by the SLDRAM 16.

The read FIFO buffer 124 sequentially applies the 16-bit words to a driver circuit 128 which, in turn, applies the 16-bit data words to a data bus 130 forming part of the processor bus 14. The driver circuit 128 also applies the data clock signal DCLK to a clock line 132 so that the memory controller (not shown) processor or other device reading data on the data bus 130 can be synchronized with the data.

The phase of the RCLK signal relative to the phase of the DCLK signal selected during the initialization procedure will also vary in an unpredictable and uncontrollable manner for the same reasons that the phase of the DCLK signal relative to the phase of the ICLK signal varies in an unpredictable and uncontrollable manner. As explained above, the data are clocked into the read FIFO buffer 124 by the DCLK signal, and a portion the circuitry (not shown) in the read FIFO buffer 124 that receives the data from the multiplexer thus operates in the clock domain of the DCLK signal. However, the portion the circuitry (not shown) in the read FIFO buffer 124 that applies the data to the driver circuit 128 operates in the clock domain of the RCLK signal. As a result, the read FIFO buffer 124 operates in two different clock domains, namely the clock domain of the DCLK signal and the clock domain of the RCLK signal.

The write data path 112 includes a receiver buffer 140 coupled to the data bus 130. The receiver buffer 140 sequentially applies 16-bit words from the data bus 130 to four input registers 142, each of which is selectively enabled by a signal from a clock generator circuit 144. The clock generator circuit generates these enable signals responsive to the data clock DCLK, which, for write operations, is applied to the SLDRAM 16 on line 132 from the memory controller or other device that applies the write data to the memory device.

As with the ICLK signal, the clock generator 144 is programmed during the initialization procedure so that the clock signal applied to the input registers 142 has a phase relative to the phase of the DCLK signal that is best able to clock the write data into the input registers 142. This procedure is similar to the initialization procedure described above for selecting the phase of the ICLK signal.

In operation, the input registers 142 sequentially store four 16-bit data words and combine them into one 64-bit data word applied to a write FIFO buffer 148. The write data are clocked into the write FIFO buffer 148 by a clock signal generated from the DCLK signal by the clock generator 144. The input registers 142 and the input portion of the write FIFO buffer 148 operate in the clock domain of the DCLK signal generated by the memory controller or other device. It should be noted that the write DCLK signal and the read DCLK signal are generated by different devices; the write DCLK signal is generated by the memory controller while the read DCLK signal is generated by the clock generator 40. As a result, the DCLK signal generated during a write operation establishes a clock domain that is different from the clock domain established by the DCLK signal generated during a read operation.

The data stored in the write FIFO buffer 148 are clocked into a write latch and driver 150 by a write clock WCLK signal to sequentially apply 64-bit write data to a write latch and driver 150. The write latch and driver 150 applies the 64-bit write data to one of the memory banks 80a–h through the I/O gating circuit 102 and the sense amplifiers 104. The WCLK signal is generated by the clock generator 40 to correspond to the timing at which the memory arrays 80a–h are able to receive the write data. The WCLK signal is thus in the clock domain of the ICLK signal, which is used to time the control signals generated by the command decoder and sequencer 60, as explained above. Thus, the write to data coupled through the write FIFO buffer 148 must also be coupled across two clock domains, namely the clock domain of the clock signal from the clock generator 144 and the clock domain of the ICLK signal.

The structure and operation of the SLDRAM 16 shown in FIG. 1 is shown and explained in greater detail in U.S. patent application Ser. No. 08/994,461 to Manning, which is incorporated herein by reference. As explained therein, one of the control signals generated in the clock domain of the ICLK signal is a STARTDCLK* signal that initiates the transfer of data to and from the SLDRAM 16. As explained further below, the read FIFO buffer 124 and the write FIFO buffer 148 respond to the STARTDCLK* signal to initiate the clock signal that couples data from the data bus 130 to the read FIFO buffer 124 and from the write FIFO buffer 148 to the data bus 130.

The problems encountered in coupling a signal from a portion of the SLDRAM 16 operating in one clock domain to a portion of the SLDRAM 16 operating in a second clock domain can be explained with reference to FIG. 2. The problem is initially explained with reference to crossing from the ICLK clock domain to the DCLK clock domain in the read FIFO buffer 124.

As shown in FIG. 2, four sets of data D0–D3 are clocked out of the latch 120 and coupled through the multiplexer 122 in synchronism with the ICLK signal. The data are clocked into the read FIFO offer 124 by the DCLK signal, as mentioned above. As shown in the third line of FIG. 2, the DCLK-A signal has a phase that lags the phase of the ICLK signal. The DCLK-A signal is thus able to accurately clock the data into the read FIFO buffer 124, as shown in the 4$^{th}$ line of FIG. 2.

The DCLK signal may alternatively have a phase that leads the phase of the ICLK signal, as shown by the signal DCLK-B in the 5$^{th}$ line of FIG. 2. Under these circumstances, the DCLK-B signal attempts to clock the first set of data D0 into the read FIFO buffer 124 at time $t_0$, i.e., before the first set of data D0 have been coupled through the multiplexer 122. Furthermore, the DCLK-B signal becomes inactive before the fourth set of data D3 are coupled through the multiplexer 122. Therefore, the DCLK-B signal fails to clock the fourth set of data D3 into the read FIFO buffer 124.

A similar problem exists in the read FIFO buffer 122 when crossing from the clock domain established by the DCLK signal to the clock domain established by the RCLK signal. As illustrated FIG. 3, the DCLK signal is shown in the first line of FIG. 3 clocking four sets of data D0–D3 into the read FIFO buffer 124, as shown in the second line of the FIG. 3. The second and third lines of FIG. 3 show a read clock signal RCLK-A, which lags the DCLK signal, clocking the four sets of data D0–D3 out of the read clock buffer 124. As shown in the second and third lines of FIG. 3, the RCLK signal is able to properly clock the data D0–D3 out of the read FIFO buffer 124 when the RCLK signal lags the DCLK signal. However, when the RCLK signal leads the DCLK signal, as shown by the RCLK-B signal in the fifth line, the data cannot be properly clocked from the read FIFO buffer 124. Specifically, the RCLK-B signal attempts to clock the first set of data D0 out of the buffer 124 before the DCLK signal has clocked the data D0 into the buffer 124. Further, since the RCLK-B signal has become inactive by the time the fourth set of data D3 are clocked into the buffer 124, the fourth set of data D3 are never clocked out of the buffer 124.

A similar problem exists in the write FIFO buffer 148 when crossing from the clock domain established by the clock signal from the clock generator 144 to the clock domain established by the ICLK (WCLK) signal.

While the above problems could apparently be solved by preestablishing set phase relationships between the ICLK and the DCLK signals, between the DCLK and RCLK signals, and between the ICLK signal and the clock signal from the clock generator 144, doing so would preclude the phases of these signals from being properly adjusted during the above-described initialization procedures.

There is therefore a need to provide a method and apparatus that is capable of coupling signals between two or more clock domains. Although the problem is illustrated with respect to a packetized DRAM like the SLDRAM, the problem may also exist to varying degrees with other types of memory devices, such as synchronous DRAMs.

SUMMARY OF THE INVENTION

A method and apparatus for coupling data across first and second clock domains defined by respective first and second clock signals. A phase comparator receiving signals indicative of the relative phase of the first and second clock signals generates a phase signal indicative of whether or not the first clock signal leads the second clock signal. The phase signal is applied to a state machine that also receives either the first or second clock signal and a start signal signifying the start of coupling the data between the first and second clock domains. The state machine generates an output clock signal synchronized to the clock signal received by the state machine that is adapted to clock the data between the clock domains. The state machine is responsive to the phase signal to adjust the time period from the start signal to when the output clock signal is generated so that the time period is longer when the first clock signal leads the second clock signal than when the first clock signal does not lead the second clock signal.

DETAILED DESCRIPTION OF THE INVENTION

Figure 1:
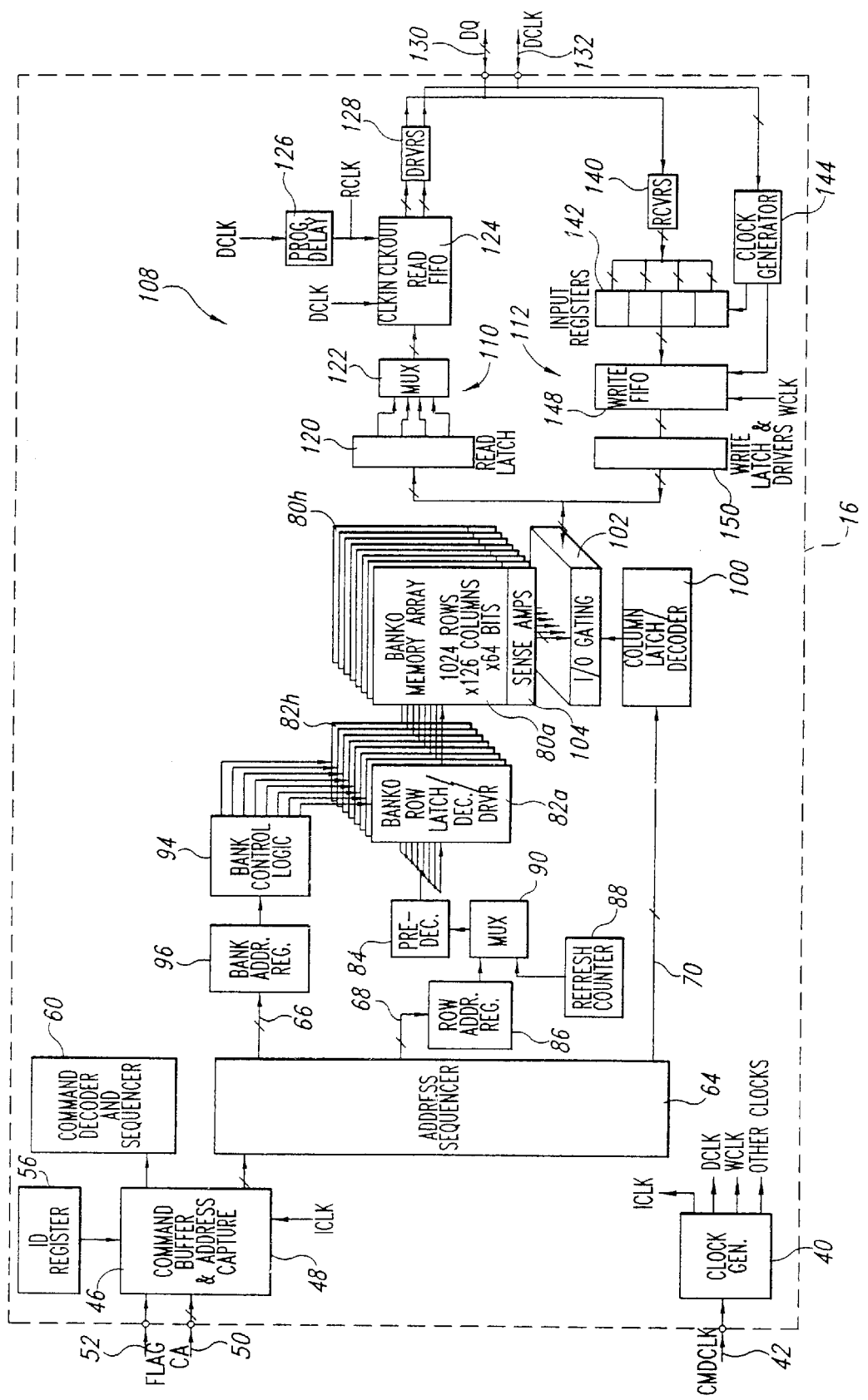
FIG. 1 is a block diagram of a packetized DRAM that contains circuitry operating in multiple clock domains.
Figure 4:
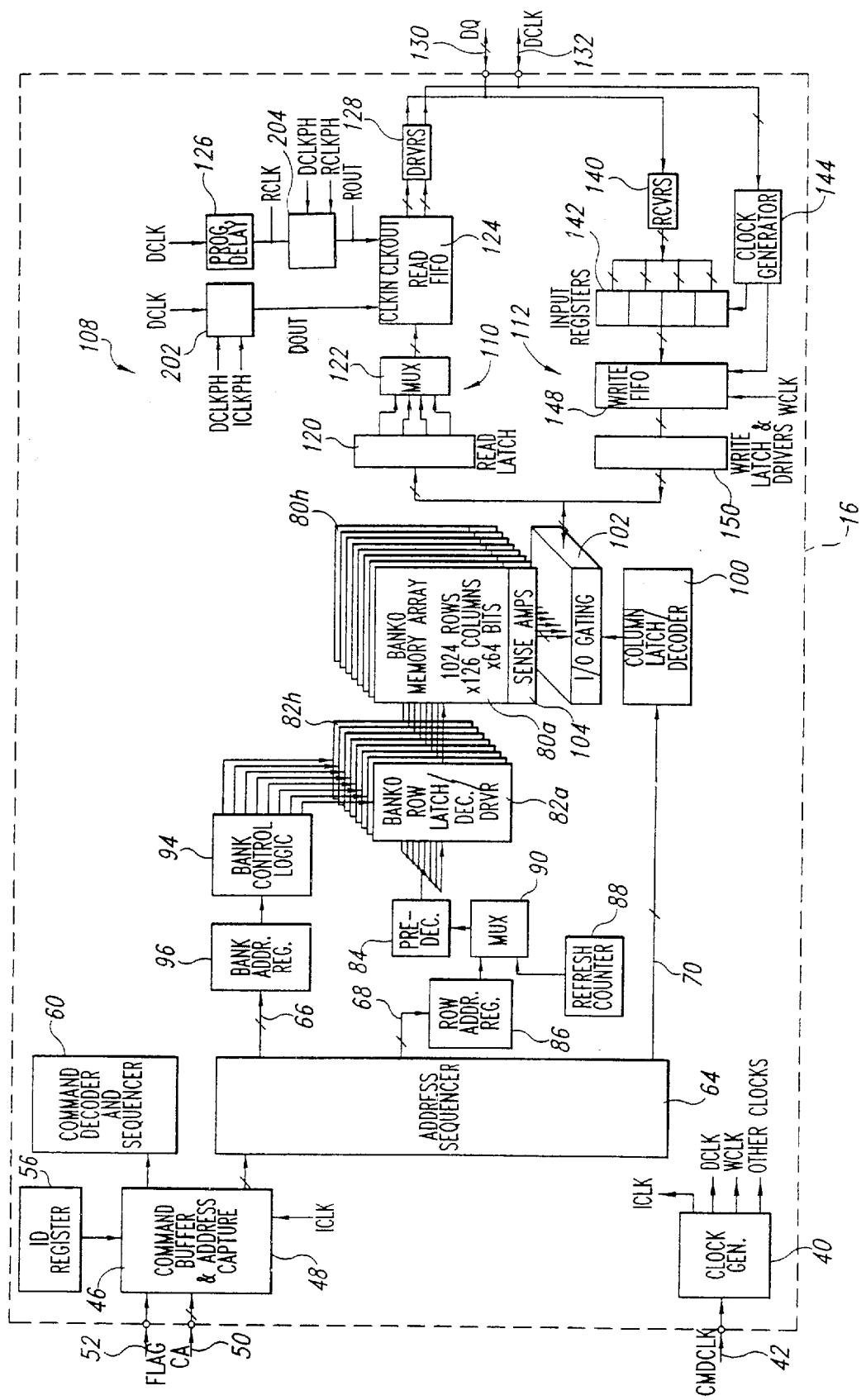
FIG. 4 is a block diagram of a packetized DRAM that incorporates a coupling circuit in accordance with an embodiment of the invention.

A block diagram of an exemplary embodiment of a memory device 200 in accordance with the invention is illustrated in FIG. 4. Most of the components of the memory device 200 are the same as the components of the SLDRAM 16 of FIG. 1. Therefore, in the interests of brevity, the structure and operation of the entire memory device 200 will not be explained. The memory device 200 includes a first coupling circuit 202 that receives the DCLK signal and applies a clock signal DOUT to the CLKIN input of the read FIFO buffer 124. The coupling circuit 202 also receives a first set of bits DCLKPH indicative of the phase of the DCLK signal, and a second set of bits ICLKPH indicative of the phase of the ICLK signal.

The memory device 200 also includes a similar coupling circuit 204 that receives the RCLK signal from the programmable delay circuit 126 and applies a clock signal ROUT to the CLKOUT input of the read FIFO buffer 124. The coupling circuit 204 also receives sets of data bits DCLKPH and RCLKPH indicative of the phases of the DCLK signal and the RCLK signal, respectively.

Finally, the memory device 200 also includes another coupling circuit 206 that receives the clock signal from the clock generator circuit 144 and applies a clock signal DOUT to the CLKIN input of the write FIFO buffer 148. The coupling circuit 206 also receives sets of data bits DCLKPH and WCLKPH indicative of the phases of the DCLK signal and the WCLK signal, respectively.

Figure 5:
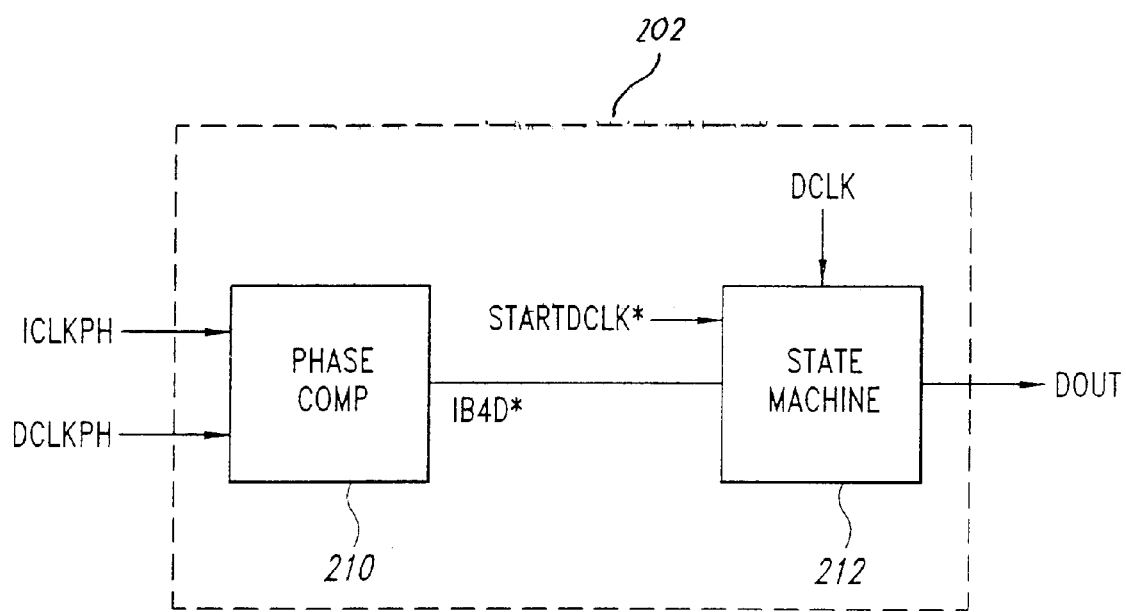
FIG. 5 is a block diagram showing one embodiment of a coupling circuit used in the packetized DRAM of FIG. 4.

One embodiment of the coupling circuits 202, 204, 206 is illustrated in FIG. 5. The coupling circuit shown is the coupling circuit 202, but the remaining coupling circuits 204, 206 are essentially the same. The coupling circuit 202 includes a phase comparator 210 that receives the data ICLKPH and DCLKPH indicative of the phases of the ICLK and DCLK signals. The phase comparator 210 compares the phases indicated by ICLKPH and DCLKPH, and generates an active low ICLK before DCLK signal ("IB4D*") if the phase of the ICLK signal (as indicated by ICLKPH) leads the phase of the DCLK signal (as indicated by DCLKPH).

The IB4D* signal from the phase comparator 210 is applied to a state machine 212, which also receives the DCLK signal and the STARTDCLK* signal. As explained above, the STARTDCLK* signal is a control signal in the clock domain of the ICLK signal, and it signifies the start of a data transfer to or from the memory array 80. However, the actual transfer of data to or from the memory array 80 must be synchronized to DCLK or the clock from the clock generator circuit 144, as explained above.

The function of the state machine 212 is to generate the DOUT signal by coupling the DCLK signal to the output of the state machine 212 after a number of DCLK transitions have occurred after the STARTDCLK* signal has transitioned active low. The number of transitions of DCLK that occur before the DOUT signal is generated is determined by the logic level of the IB4D* signal.

Figure 6:
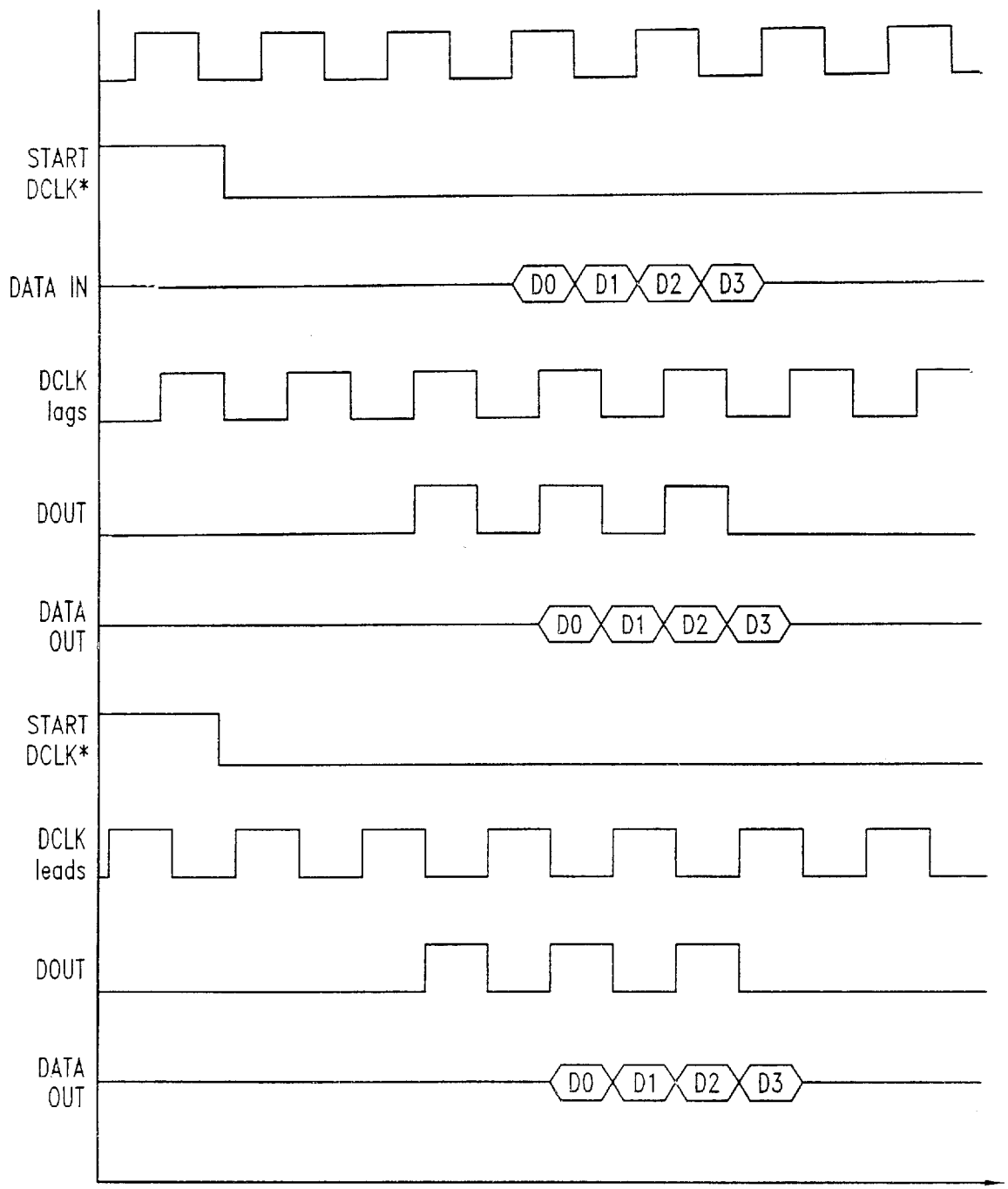
FIG. 6 is a timing diagram illustrating signals present in the coupling circuit of FIG. 5.

With references to FIG. 6, the ICLK signal is shown in the first line, and the STARTDCLK signal is shown transitioning active low in synchronism with the DCLK signal, although it alternatively may be delayed from a transition of the DCLK signal. Five transitions of ICLK after STARTDCLK* becomes active, the first of four words of the read data are output from the multiplexer 122, as shown in the third line of FIG. 6.

Figure 2:
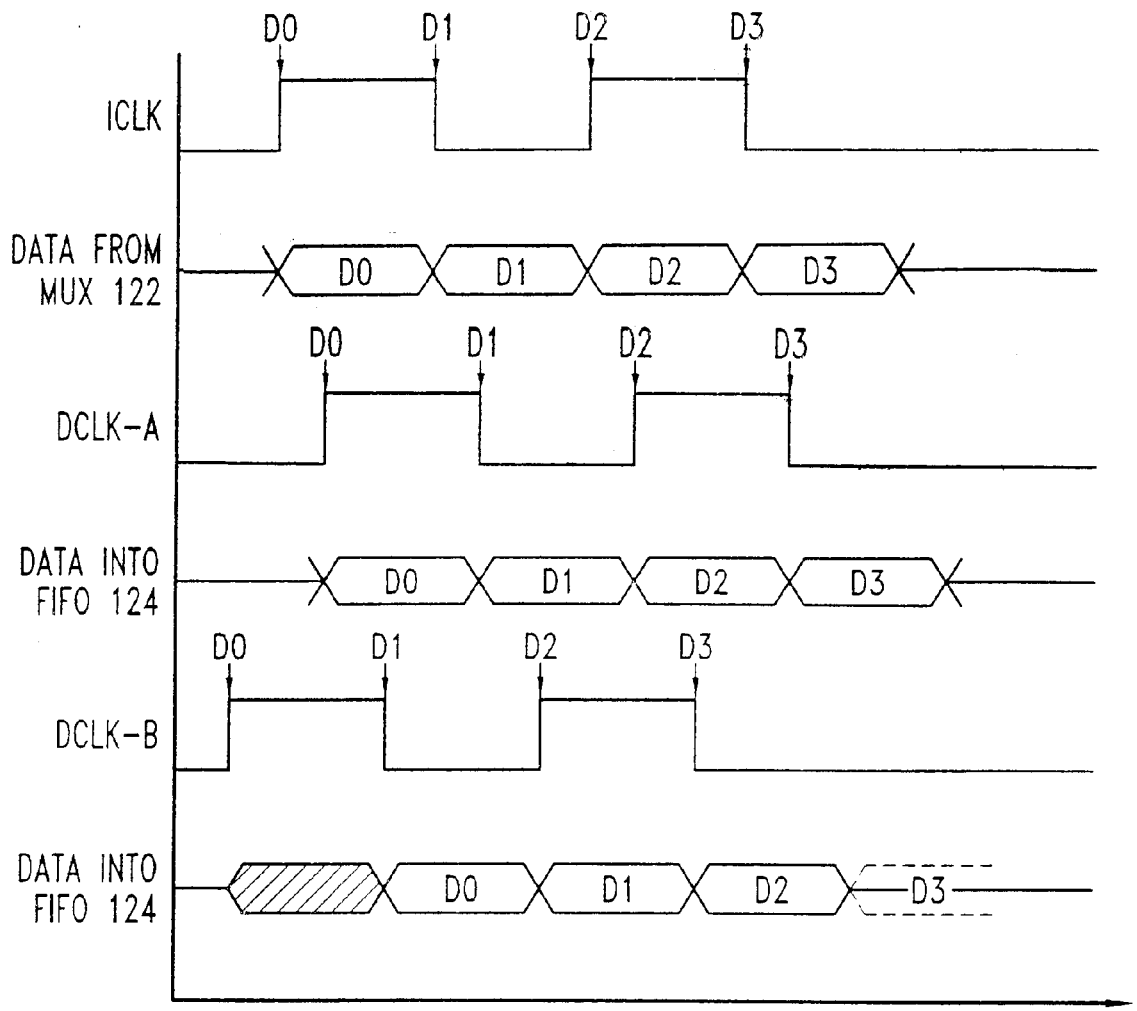
FIG. 2 is a timing diagram providing one example of problems encountered when coupling signals across two clock domains in the packetized DRAM of FIG. 1.
Figure 3:
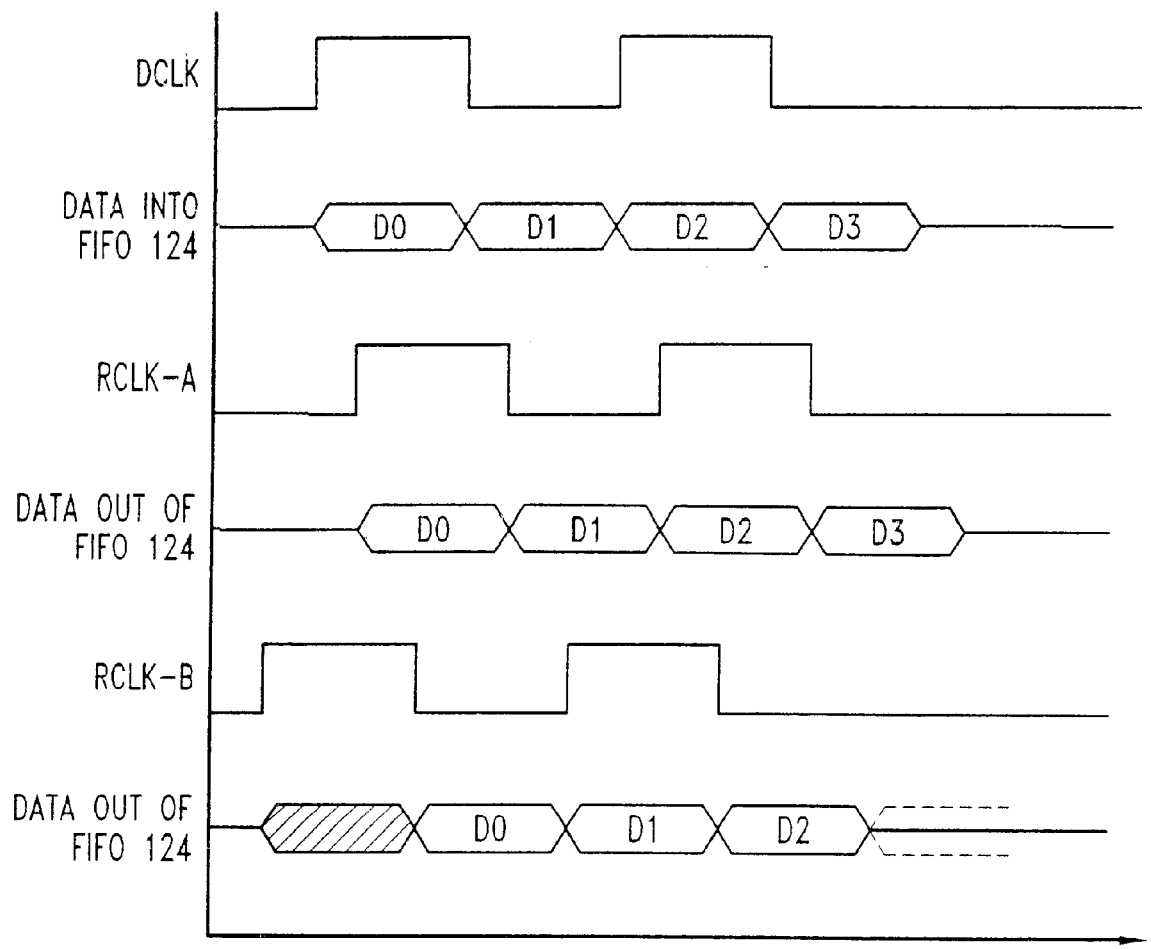
FIG. 3 is a timing diagram providing another example of problems encountered when coupling signals across two clock domains in the packetized DRAM of FIG. 1.

One example of a DCLK signal is shown in the fourth line of FIG. 6. The DCLK signal is shown lagging the ICLK signal, so the IB4D* signal is active low. On the third transition of DCLK after STARTCLK* becomes active, the state machine 212 starts generating the DOUT signal, as shown in the sixth line of FIG. 6. The DOUT signal is then generated for six transitions of DCLK. The memory device is constructed to ignore the first two transitions of the DOUT signal. As a result, the first of four words of read data are clocked by the third transition of the DOUT signal, as shown in the seventh line of FIG. 6. Note that the relationship between ICLK, DCLK, and the data clock out of the multiplexer 122 and into the read FIFO buffer 124 is the same as that shown in lines 1–4 of FIG. 2. As a result, since the ICLK signal leads the DCLK signal, the ICLK signal clocks each set of the data from the multiplexer 122 before the DCLK signal attempts to clock the same set of data into the read FIFO buffer 124. However, as explained above with reference to line 1,2, 5 and 6 of FIG. 2, if the ICLK signal lags the DCLK signal, the DCLK signal attempts to clock each set of the data from the multiplexer 122 before the ICLK signal clocks the same set of data from the multiplexer 122.

The embodiment of the coupling circuit shown in FIGS. 4 and 5 avoids the problem caused by the ICLK signal lagging the DCLK signal by delaying the DOUT signal for one transition if the IB4D* signal is inactive high. With continued reference to FIG. 6, the DCLK signal is shown in line 8 as leading the ICLK signal, which would create the above-described data transfer problem if the coupling circuit 202 operated in the same manner as described above. Instead, the coupling circuit 202 delays initiation of the DOUT signal for an additional transition of DCLK after the STARTDCLK* signal shown in line 7 transitions active low. More specifically, as shown in the ninth line of FIG. 6, the DOUT signal becomes active on the fourth transition of DCLK after STARTDCLK* becomes active. In contrast, as shown in the sixth line of FIG. 6, the DOUT signal becomes active on the third transition of DCLK after STARTDCLK* becomes active when IB4D* is active low. As a result, the DOUT signal clock each set of data into the read FIFO buffer 124 only after the same set of data are clock out of the multiplexer 122, as shown in the tenth line of FIG. 6.

The embodiment of the coupling circuit explained above with reference to FIG. 5 delays the DOUT signal for one transition if the ICLK signal lags the DCLK signal. However, the problems caused by the ICLK signal lagging the DCLK signal can alternatively be solved by accelerating the ICLK signal for one transition if the ICLK signal lags the DCLK signal. Thus, in another embodiment of the coupling circuit used in the SLDRAM 16 of FIG. 4, the comparator 210 in the coupling circuit operates in the same manner to compare the phase of the ICLK signal, as indicated by ICLKPH, to the phase of the DCLK signal, as indicated by DCLKPH. The Comparator 210 then outputs the IB4D* signal indicative of the results of the comparison. The state machine 212 operates in a manner similar to that explained above except that it advances initiation of the ICLK signal by one transitions after the STARTDCLK* transitions active low.

As mentioned above, the other coupling circuits 204, 206 operate in essentially the same manner as the coupling circuit 202. Specifically, the coupling circuit 204 generates an active low DB4R* signal whenever the DCLK signal leads the RCLK signal. When the DB4R* signal is active, the coupling circuit generates the ROUT signal three transitions of RCLK following the STARTDCLK* signal becoming active. If the DB4R* is inactive, the coupling circuit generates the ROUT signal four transitions of RCLK following the STARTDCLK* signal becoming active. In this manner, the coupling circuit prevents the RCLK signal from attempting to clock each set of data out of the read FIFO register 124 before the same set of data have been clocked into the read FIFO register by each transition of the DCLK signal.

Similarly, the coupling circuit 206 operates in the same manner to generate an active DB4W* signal whenever the DCLK signal leads the WCLK signal. When the DB4W* signal is active, the coupling circuit generates the DOUT signal (note, this is a different DOUT signal from the DOUT signal generated by the coupling circuit 202) three transitions of the clock signal from the clock generator circuit 144 following the STARTDCLK* signal becoming active. If the DB4W* is inactive, the coupling circuit generates the DOUT signal four transitions of the clock signal from the clock generator circuit 144 following the STARTDCLK* signal becoming active. In this manner, the coupling circuit prevents the WCLK signal from attempting to clock each set of data out of the write FIFO register 148 before the same set of data have been clocked into the write FIFO register 148 by each transition of the clock signal from the clock generator 144.

Figure 7A:
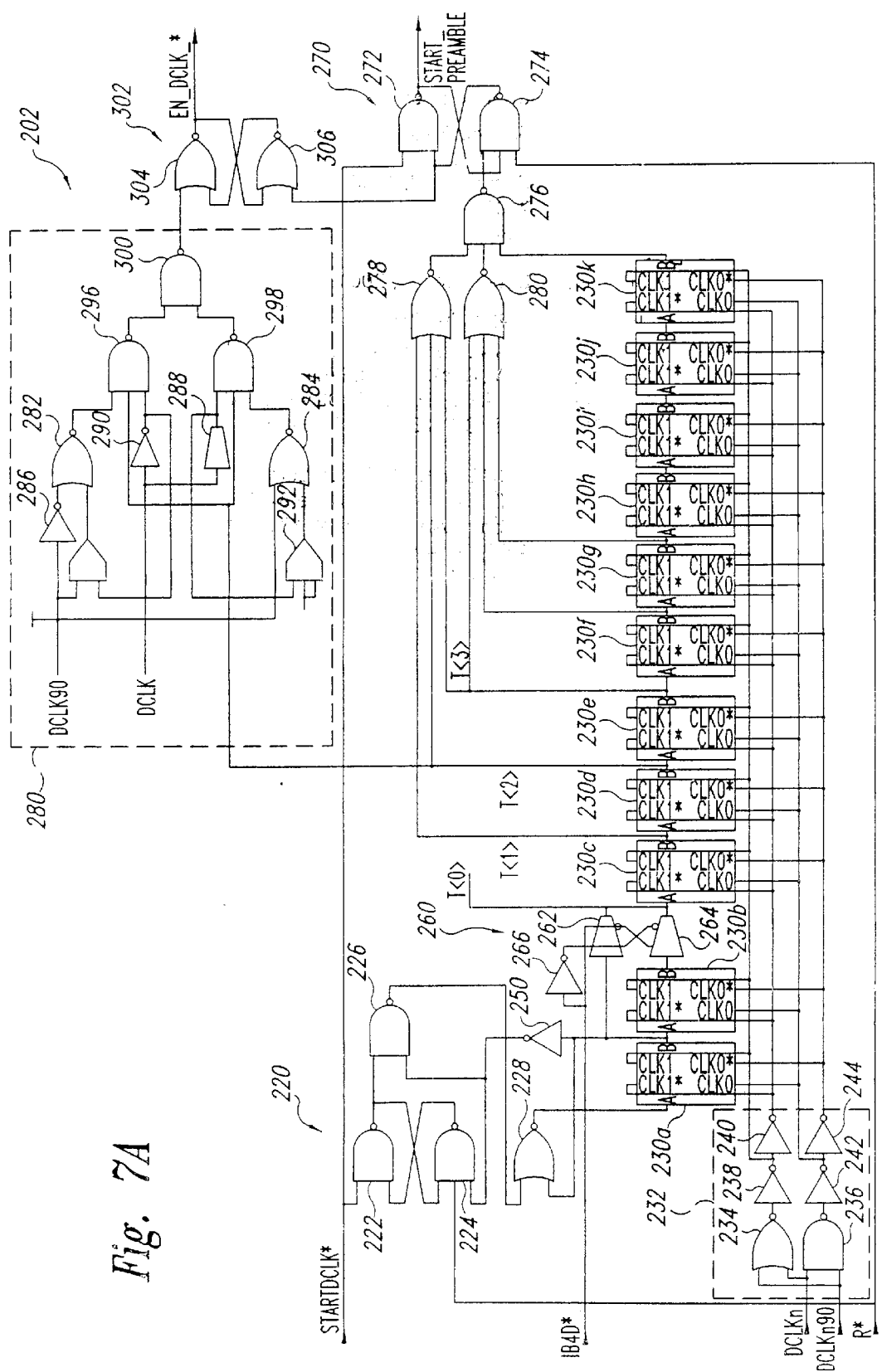
FIGS. 7A and 7B are logic diagrams showing one embodiment of the coupling circuit of FIG. 5.
Figure 7B:
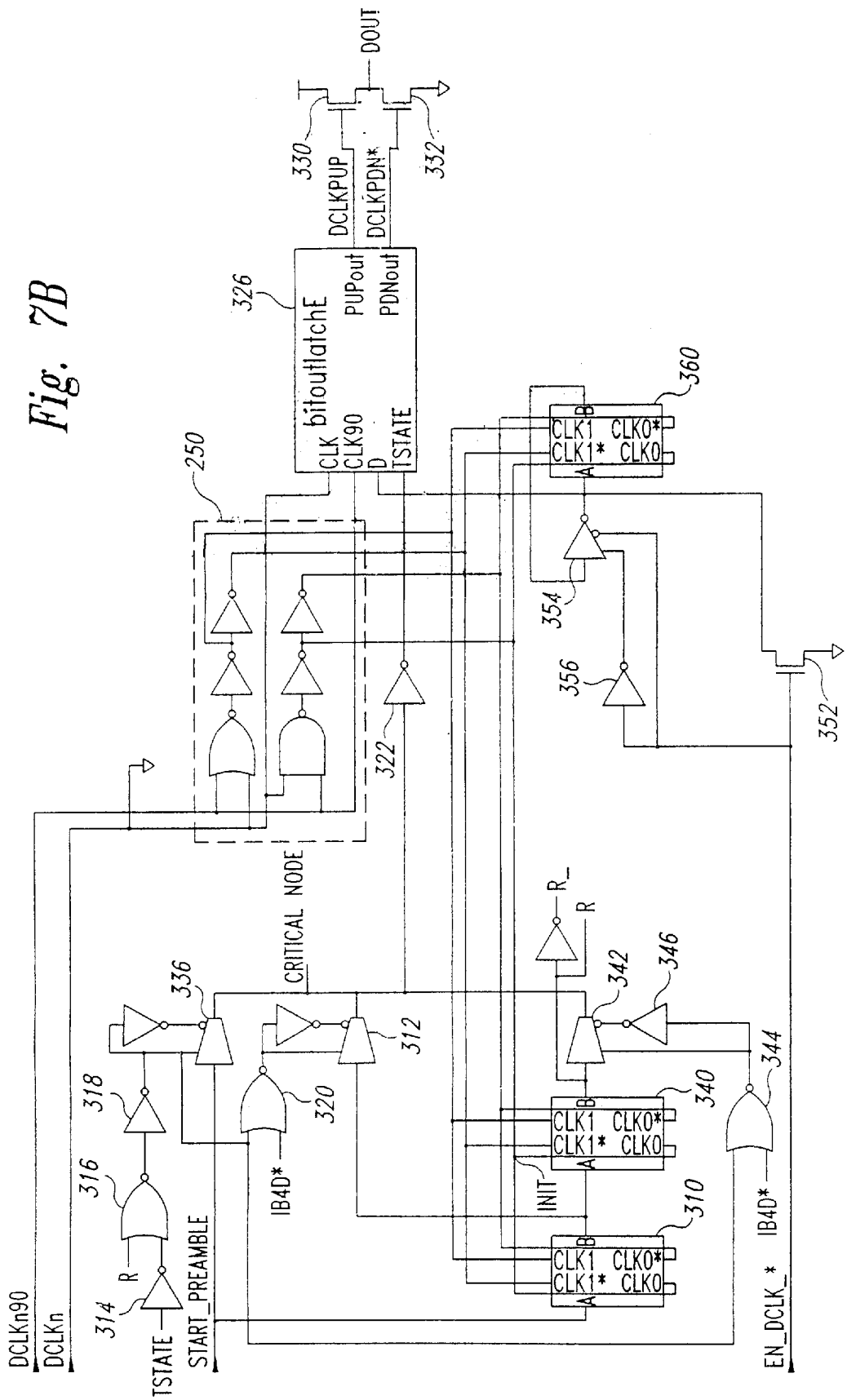

One embodiment of the coupling circuit 202 is illustrated in FIGS. 7A and 7B. With reference to FIG. 7A, the STARTDCLK* signal is applied to a flip-flop 220 formed by a pair of NAND gates 222, 224. The flip-flop 220 is initially reset by a low applied to the NAND gate 224 from the R* input. The active low STARTDCLK* signal sets the flip-flop 220, thereby applying a high to a NAND gate 226. As explained below, the other input of the NAND gate 226 is initially high. The NAND gate 226 therefore outputs a low to one input of a NOR gate 228. The other input of the NOR gate 228 is initially high, so the NOR gate 228 outputs a high to the first in a series of latches 230a–k. All of the latches 230a–k are clocked in common by a clock circuit 232 formed by a NOR gate 234 a NAND gate 236 and four inverters 238–244. The structure and operation of the clock circuit 232 and the latches 238a–k are described in detail in the above-identified Patent Applications * to Manning. Therefore, in the interest of brevity, the structure and operation of the clock circuit 232 and latches 230a–k will not be described in detail. Basically, the clock circuit 232 causes the input to the first latched 230a to be latched and then clocked through each of the remaining latches 230b–k on each transition of the DCLK signal, which is applied to the clock circuit to 32 along with its quadrature signal DCLK90.

Thus, in response to the STARTDCLK* signal, a logic "1" is applied to the first latch 230a, and this logic "1" is successively advanced through with the remaining latches 230b–k on each transition of the DCLK signal.

As mentioned above, the flip-flop 220 is initially reset by the active low R* signal. Thus, the NAND gate 226 initially outputs a high that causes the NOR gate 228 to apply a logic "0" to the latch 230a. The latch 230a thus initially outputs a low that enables the NOR gate 228, and the low is also coupled through an inverter 250 to enable the NAND gate 224, as mentioned above. The inverter 250 also applies a low to the NAND gate 224 to reset the flip-flop 220 when the logic "1" applied to the latch 230a has been shifted to its output. Similarly, when the logic "1" has been shifted to the output of the latch 230a, it causes the NOR gate 228 to apply a logic "0" to the first latch 230a. As a result, only one logic "1" signal is shifted through the latches 230a–k responsive to the active low STARTDCLK* signal.

The coupling circuit 202 also includes a bypass circuit 260 constructed to selectively bypass the second latch 230b. The bypass circuit 260 is formed by a pair of pass gates 262, 264 driven by the phase signal IB4D* directly and through an inverter 266. When the phase signal IB4D* is high indicative of the ICLK signal lagging the DCLK signal, the latch 230c receives its input from the latch 230b through the pass gate 264. When the phase signal IB4D* is low indicative of the ICLK signal leading the DCLK signal, the latch 230c receives its input from the latch 230a through the pass gate 262. Thus, the bypass circuit 260 bypasses the latch 230b when the phase signal IB4D* is low. As explained below, bypassing the latch 230b causes the data clock DOUT signal to be generated one transition of the DCLK signal earlier after the STARTDCLK* signal transitions active low.

The STARTDCLK* signal is also applied to a flip-flop to 70 formed by a pair of NAND gates 272, 274. The flip-flop 270 is set responsive to the STARTDCLK* signal transitioning active low so that the NAND gate 272 outputs a high START_PREAMBLE signal. The flip-flop 270 is reset responsive to either an active low reset signal R* or a low output by a NAND gate 276. The NAND gate 276 outputs a low responsive to receiving high signals from a pair of NOR gates 278, 280 and the output of the final latch 230k. The NOR gates 278, 280 collectively decode logic "0" outputs from all of the latches 230a–k. Thus, the active high START_PREAMBLE signal is generated responsive to the active low STARTDCLK* signal and it terminates after the logic "1" has been shifted through all of the latches 238a–k.

The output of the latch 230d is applied to a clock circuit 280 that also receives the output of the NAND gate 274 in the flip-flop 270. The clock circuit 280 is formed by a pair of NOR gates 282, 284. The NOR gate 282 receives the quadrature DCLK90 signal through an inverter 286 and the DCLK signal coupled through a pass gate 288 and a delay circuit 290. The NOR gate 284 receives the DCLK90 signal and the complement of the DCLK signal through an inverter 290, and a delay circuit 292. The clock circuit 288 also includes a pair of NAND gates 296, 298 that drive a NAND gate 300. The is NAND gates 296, 298 are enabled when the logic "1" input to the latch 230a has been shifted to the output of the latch 230d. The NAND gate 300 then outputs a high to set a flip-flop 302 formed by a pair of NOR gates 304, 306. Thus, on the second or third transition of the DCLK signal (depending upon whether the latch 230b is bypassed), an active low EN_DCLK* signal is generated. When the logic "1" applied to the latch 230a has been shifted through all of the latches 230a–k to reset the flip-flop 270, the flip-flop 302 is also reset, thereby driving the EN_DCLK* signal inactive high.

With reference to FIG. 7B, the START_PREAMBLE signal is applied to a latch than 310 that is clocked on the first subsequent transition of the DCLK signal. The output of the latch 310 is applied to a pass gate 312. The conductive state of the pass gate 312 is controlled by a tristate signal TSTATE, which is high initially when the DCLK output terminal of the memory device is in a tristate condition, as explained further below.

The high TSTATE signal is coupled through an inverter 314, an enabled NOR gate 316, an inverter 318, and a NOR gate 320. When the TSTATE signal is high and the IB4D* signal is active low, the output of the NOR gate 320 will be high, thereby enabling the pass gate 312. Thus, when the START_PREAMBLE signal goes high, it causes an inverter 322 to transition the TSTATE signal low. The TSTATE signal is applied to an output latch 326 of conventional design. The DCLKPUP and DCLKPDN* signals at the output of the latch 326 are coupled to respective and NMOS transistors 330, 332 that generate the data out signal DOUT at their common node. When the TSTATE input to the latch 326 is high, the output latch 326 drives both of its outputs low, thereby turning OFF both NMOS transistors 330, 332 to place the DOUT output at a high impedance.

If the IB4D* signal is inactive high, the pass gate 312 is disabled so that it does not drive TSTATE low on the first transition of the DCLK signal after the START_PREAMBLE signal goes high. Instead, if the IB4D* signal is inactive high, the high-to-low transition of the TSTATE signal is delayed for an additional transition of the DCLK signal for reasons that will now be explained. The output of the latch 310, which transitions low on the transition of DCLK following the START_PREAMBLE signal going high, is also applied to a latch 340. On the next transition of DCLK, the high at the output of the latch 310 is clocked to the output of the latch 340 and applied to a pass gate 342. Since the IB4D* signal is inactive high, a NOR gate 344 to which the IB4D* signal is applied outputs a low that is applied to the pass gate 342 directly and through an inverter 346. The pass gate 342 then couples the output of the latch 340 to the inverter 322. Thus, the TSTATE signal goes inactive low on the first transition of DCLK after the START_PREAMBLE signal goes high if the IB4D* signal is low, and on the second transition of DCLK after the START_PREAMBLE signal goes high if the IB4D* signal is high.

In either case, the low TSTATE signal enables the output latch 326 so that it drives the transistors 330, 332 in accordance with the logic level of a signal clocked into the latch 326 from the D input. The output latch 326 is clocked by clocking signals from a clocking circuit 350 that is identical in structure and operation to the clocking circuit 232 of FIG. 7A. Thus, when the TSTATE signal is inactive low, the DOUT signal corresponds to the logic level applied to the D input at each transition of the DCLK signal.

The D input of the output latch 326 is coupled to the input of a latch 360, which is also clocked by the clocking circuit 350. The input of the latch is initially held low by an NMOS transistor 352, which is turned ON by the EN_DCLK* signal being inactive high. The output of the latch 360, which is fed back to the D input of the latch 360 through a tristate inverter 354, is thus initially low. However, since the controls inputs of the tristate inverter 354 receive the EN_DCLK* signal directly and through an inverter 356, the inverter 354 is inactive when the EN DCLK signal is inactive high.

When the EN_DCLK* signal transitions active low, it turns OFF the NMOS transistor 352 and enables the tristate inverter 354. As a result, the low at the output of the latch 360 causes the inverter 354 to apply a high to the input of the latch 360 as well as the input to the output latch 326. On the next transition of the DCLK signal, the output latch 326 drives the DCLKPUP signal high to turn ON the NMOS transistor 330 and the DCLKPDN signal low to turn OFF the transistor 332. The same transition of the DCLK signal that caused DOUT to go high, clocks the high at the input of the latch 360 to the output of the latch 360, thereby causing the inverter 354 to apply a low to the input of the output latch 326. On the next transition of the DCLK signal, the low is clocked into the latch 326, thereby causing DOUT to go low. In this manner, the latch 360 continues to toggle, and the DOUT signal changes accordingly, until the EN_DCLK signal transitions inactive high. The high EN_DCLK signal then turns ON the NMOS transistor 352 to hold the D input to the output latch 326 low.

When the TSTATE signal transitions low responsive to the START_PREAMBLE signal, it turns ON a pass gate 336 thereby coupling the high START_PREAMBLE signal to the inverter 322. The low TSTATE signal is thus generated until the START_PREAMBLE signal transitions low, as explained above with reference to FIG. 7A. When the START_PREAMBLE signal transitions low, it is coupled through the pass gate 336 to immediately drive the TSTATE signal high. Thus, by coupling the START_PREAMBLE to the inverter 322 through a pass gate 336 that is enable only when TSTATE is low, the inactive low TSTATE signal can be generated after an adjustable number of DCLK transitions have occurred following the START_PREAMBLE signal going high, and the active high TSTATE signal can be generated as soon as the START_PREAMBLE signal goes low.

Summarizing the operation of the coupling circuit 202, the START_PREAMBLE signal is generated as soon as the STARTDCLK* signal goes active low. The START_PREAMBLE signal, in turn, causes TSTATE to go inactive low after one or two transitions of DCLK, depending on whether the IB4D* signal is high or low. The TSTATE signal switches the transistors 330, 332 out of a high impedance condition. Thereafter, following a number of DCLK transitions depending upon the state of the IB4D* signal, the EN_DCLK signal goes active low to allow the DOUT signal to toggle responsive to each transition of DCLK. After the proper number of DCLK transitions have occurred, the flip-flop 270 is reset, thereby driving the START_PREAMBLE signal inactive low and resetting the flip-flop 302 to drive the EN_DCLK* signal inactive high. The low START_PREAMBLE signal then returns the transistors 330, 332 to a high impedance state.

Figure 8:
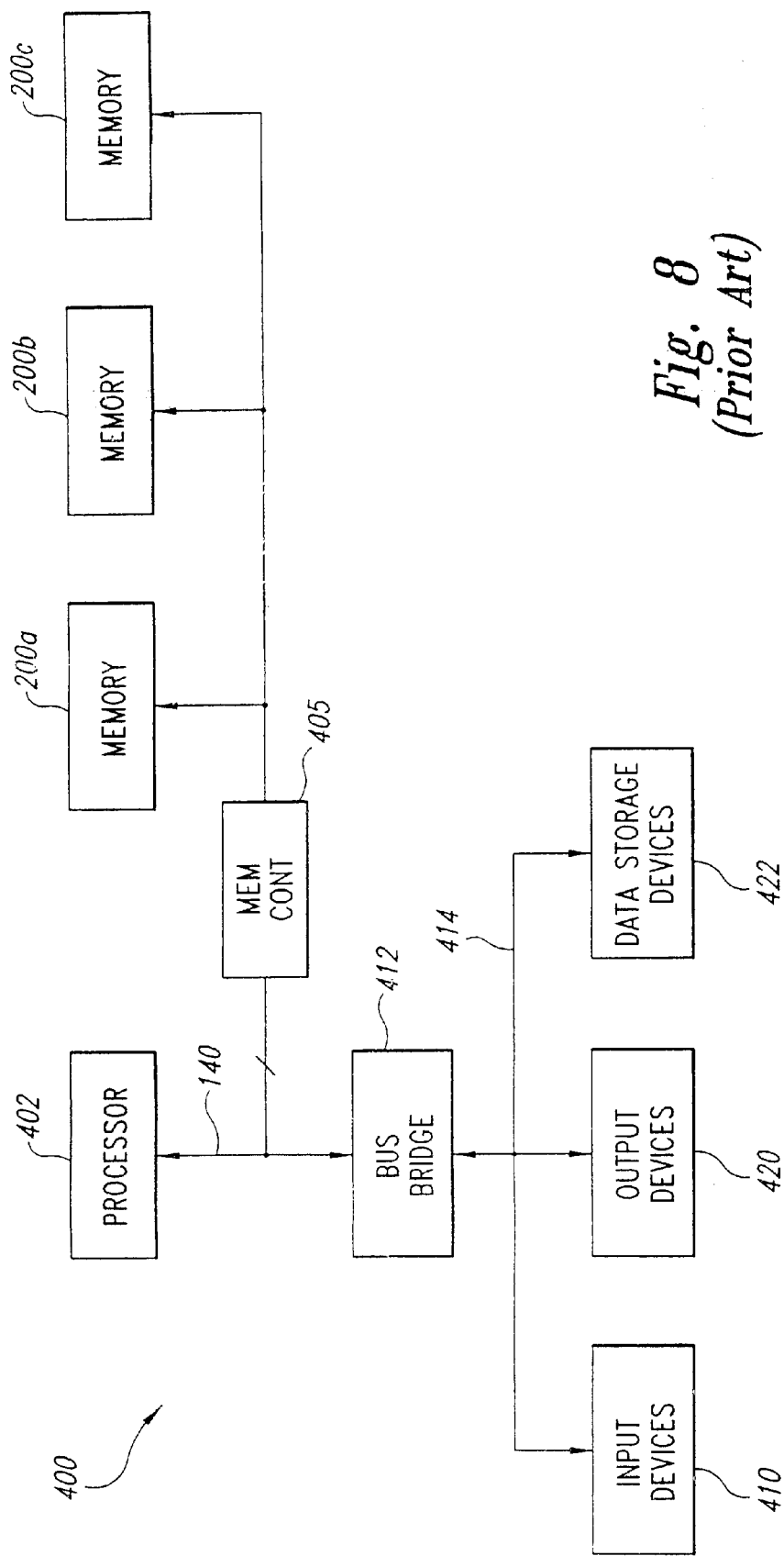
FIG. 8 is a block diagram of a computer system using the memory device of FIG. 4.

The memory device 200 can be used in a computer system, as shown in FIG. 8. With reference to FIG. 8, the computer system 400 includes a processor 402 having a processor bus 404 coupled through a memory controller 405 to three memory devices which may be packetized dynamic random access memory or SLDRAM 200a–c.

The computer system 400 also includes one or more input devices 410, such as a keypad or a mouse, coupled to the processor 402 through a bus bridge 412 and an expansion bus 414, such as an industry standard architecture ("ISA") bus or a Peripheral component interconnect ("PCI") bus. The input devices 410 allow an operator or an electronic device to input data to the computer system 400. One or more output devices 420 are coupled to the processor 402 to display or otherwise output data generated by the processor 402. The output devices 420 are coupled to the processor 402 through the expansion bus 414, bus bridge 412 and processor bus 404. Examples of output devices 420 include printers and video display units. One or more data storage devices 422 are coupled to the processor 402 through the processor bus 404, bus bridge 412, and expansion bus 414 to store data in or retrieve data from storage media (not shown). Examples of storage devices 422 and storage media include fixed disk drives floppy disk drives, tape cassettes and compact-disk read-only memory drives.

In operation, the processor 402 communicates with the memory devices 200a–c via the memory controller 405. The memory controller 405 sends the memory devices 200a–c command packets that contain both control and address information. Data is coupled between the processor 402 and the memory devices 200a–c, through the memory controller 405 and a data bus portion of the processor bus 404. The memory controller 405 applies write data from the processor 402 to the memory devices 200a–c, and it applies read data from the memory devices 200a–c to the processor 402. In reading data from the memory devices 200a–c, the memory controller 405 also provides the memory devices 200a–c with timing information to adjust the timing of the read clock signal RCLK. Although all the memory devices 200a–c are coupled to the memory controller 405, only one memory device 200a–c at a time reads or writes data, thus avoiding bus contention. Bus contention is avoided by each of the memory devices 200a–c and the bus bridge 412 having a unique identifier, and the command packet contains an identifying code that selects only one of these components.

The computer system 400 also includes a number of other components and signal lines which have been omitted from FIG. 8 in the interests of brevity. For example, as explained above, the memory devices 200a–c also receive a command clock signal to provide internal timing signals, and a data clock signal clocking data into the memory device 200.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for coupling data from a first circuit operating in one clock domain defined by a first clock signal to a second circuit operating in a second clock domain defined by a second clock signal, the system comprising:

a phase comparator receiving signals indicative of a relative phase of the first and second clock signals, the phase comparator generating a phase signal indicative of whether or not the first clock signal leads the second clock signal; and a state machine receiving the first clock signal and a start signal signifying the start of coupling the data from the first circuit to the second circuit, the state machine generating an output clock signal synchronized to the first clock signal to clock the data out of the first circuit, the state machine being responsive to the phase signal to adjust a time period from the start signal to when the output clock signal is generated so that the time period is longer when the first clock signal leads the second clock signal than when the first clock signal does not lead the second clock signal, the state machine comprising:

a series of sequentially coupled latches that are clocked by the first clock signal, a first latch in the series being coupled to receive the start signal, and a final latch in the series outputting an enable signal responsive to the start signal being clocked through the series of latches;

a bypass circuit coupled to receive the phase signal, the bypass circuit being coupled between an input terminal and an output terminal of one of the latches, the bypass circuit bypassing the latch responsive to an absence of a phase signal indicative of the first clock signal leading the second clock signal; and a logic circuit coupled to receive the first clock signal and the enable signal, the logic circuit having an output terminal on which the output clock signal is generated, the enable signal causing the logic circuit to couple the first clock signal to the output terminal so that the output clock signal is generated responsive to the enable signal.

2. The system of claim 1 further comprising a flip-flop having a set input terminal coupled to receiving the start signal and a reset input terminal coupled to receive a signal from an output terminal of one of the latches, an output terminal of the flip-flop being applied to the input of the first latch of the series.

3. The system of claim 1 wherein the logic circuit comprises:

a synchronizing circuit coupled to receive the first clock signal and an output from one of the latches in the series, the synchronizing circuit being operative to generate an enable clock signal on a transition of the first clock signal subsequent to receiving a signal from the latch to which the synchronizing circuit is coupled responsive to the start signal being clocked to the latch through the series of latches; and a toggle circuit coupled to receive the first clock signal and the clock enable signal, the toggle circuit being operative to toggle responsive to each transition of the first clock signal, the output clock signal being generated at an output terminal of the toggle circuit.

4. The system of claim 3 wherein the logic circuit further comprises an output latch coupled to receive the first clock signal and the output clock signal from the toggle circuit, the output latch being operative to latch the output clock signal on the output terminal of the toggle circuit responsive to each transition of the first clock signal.

5. The system of claim 1 wherein the logic circuit further comprises:

an output circuit having an output terminal, a signal input terminal receiving the output clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the start signal and a reset input terminal coupled to a respective output terminal of at least one of the latches in the series, the flip-flop generating the tristate control signal when the flip-flop is reset.

6. A system for coupling data from a first circuit operating in one clock domain defined by a first clock signal to a second circuit operating in a second clock domain defined by a second clock signal, the system comprising:

a phase comparator receiving signals indicative of a relative phase of the first and second clock signals, the phase comparator generating a phase signal indicative of whether or not the first clock signal leads the second clock signal; and a state machine receiving the second clock signal and a start signal signifying the start of coupling the data from the first circuit to the second circuit, the state machine generating an output clock signal synchronized to the second clock signal to clock the data into the second circuit, the state machine being responsive to the phase signal to adjust a time period from the start signal to when the output clock signal is generated so that the time period is shorter when the first clock signal leads the second clock signal than when the first clock signal does not lead the second clock signal, wherein the state machine comprises:

a series of sequentially coupled latches that are clocked by the first clock signal, a first latch in the series being coupled to receive the start signal, and a final latch in the series outputting an enable signal responsive to the start signal being clocked through the series of latches;

a bypass circuit coupled to receive the phase signal, the bypass circuit being coupled between an input terminal and an output terminal of one of the latches, the bypass circuit bypassing the latch responsive to an absence of a phase signal indicative of the first clock signal leading the second clock signal; and a logic circuit coupled to receive the first clock signal and the enable signal, the logic circuit having an output terminal on which the output clock signal is generated, the enable signal causing the logic circuit to couple the first clock signal to the output terminal so that the output clock signal is generated responsive to the enable signal.

7. The system of claim 6 further comprising a flip-flop having a set input terminal coupled to receiving the start signal and a reset input terminal coupled to receive a signal from an output terminal of one of the latches, an output terminal of the flip-flop being applied to the input of the first latch of the series.

8. The system of claim 6 wherein the logic circuit comprises:

a synchronizing circuit coupled to receive the first clock signal and an output from one of the latches in the series, the synchronizing circuit being operative to generate an enable clock signal on a transition of the first clock signal subsequent to receiving a signal from the latch to which the synchronizing circuit is coupled responsive to the start signal being clocked to the latch through the series of latches; and a toggle circuit coupled to receive the first clock signal and the clock enable signal, the toggle circuit being operative to toggle responsive to each transition of the first clock signal, the output clock signal being generated at an output terminal of the toggle circuit.

9. The system of claim 8 wherein the logic circuit further comprises an output latch coupled to receive the first clock signal and the output clock signal from the toggle circuit, the output latch being operative to latch the output clock signal on the output terminal of the toggle circuit responsive to each transition of the first clock signal.

10. The system of claim 6 wherein the logic circuit further comprises:

an output circuit having an output terminal, a signal input terminal receiving the output clock signal, and a tristate input terminal receiving a tristate control signal, the output circuit being operative to place the output terminal at a high impedance responsive to the tristate control signal and to otherwise couple the signal input terminal to the output terminal; and a flip-flop having a set input terminal coupled to receive the start signal and a reset input terminal coupled to a respective output terminal of at least one of the latches in the series, the flip-flop generating the tristate control signal when the flip-flop is reset.

11. A system for coupling data through a circuit, the data being clocked into the circuit subsequent to a start signal responsive to a first clock signal in a first clock domain, and the data being clocked out of the circuit subsequent to the start signal responsive to a second clock signal in a second clock domain that may be different from the first clock domain, the system comprising:

a phase comparator receiving signals indicative of a relative phase of the first and second clock domains, the phase comparator generating a phase signal indicative of whether or not the first clock domain leads the second clock domain; and a state machine receiving the start signal and a clock signal in the second clock domain, the state machine generating the second clock signal at a time subsequent to the start signal so that the second clock signal is generated sooner when the first clock domain leads the second clock domain than when the first clock domain does not lead the second clock domain, wherein the state machine comprises:

a series of sequentially coupled latches that are clocked by the first clock signal, the first latch in the series being coupled to receive the start signal, and the final latch in the series outputting an enable signal responsive to the start signal being clocked through the series of latches;

a bypass circuit coupled to receive the phase signal, the bypass circuit being coupled between an input terminal and an output terminal of one of the latches, the bypass circuit bypassing the latch responsive to the absence of a phase signal indicative of the first clock signal leading the second clock signal; and a logic circuit coupled to receive the first clock signal and the enable signal, the logic circuit having an output terminal on which the output clock signal is generated, the enable signal causing the logic circuit to couple the first clock signal to the output terminal so that the output clock signal is generated responsive to the enable signal.

12. The system of claim 11 further comprising a flip-flop having a set input terminal coupled to receiving the start signal and a reset input terminal coupled to receive a signal from an output terminal of one of the latches, an output terminal of the flip-flop being applied to the input of the first latch of the series.

13. The system of claim 11 wherein the logic circuit comprises:

a synchronizing circuit coupled to receive the first clock signal and an output from one of the latches in the series, the synchronizing circuit being operative to generate an enable clock signal on a transition of the first clock signal subsequent to receiving a signal from the latch to which the synchronizing circuit is coupled responsive to the start signal being clocked to the latch through the series of latches; and a toggle circuit coupled to receive the first clock signal and the clock enable signal, the toggle circuit being operative to toggle responsive to each transition of the first clock signal, the output clock signal being generated at an output terminal of the toggle circuit.

14. The system of claim 13 wherein the logic circuit further comprises an output latch coupled to receive the first clock signal and the output clock signal from the toggle circuit, the output latch being operative to latch the output clock signal on the output terminal of the toggle circuit responsive to each transition of the first clock signal.

15. The system of claim 13 wherein the logic circuit further comprises:

an output circuit having an output terminal, a signal input terminal receiving the output clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the start signal and a reset input terminal coupled to a respective output terminal of at least one of the latches in the series, the flip-flop generating the tristate control signal when the flip-flop is reset.

16. A system for coupling data through a circuit, the data being clocked into the circuit subsequent to a start signal responsive to a first clock signal in a first clock domain, and the data being clocked out of the circuit subsequent to the start signal responsive to a second clock signal in a second clock domain that may be different from the first clock domain, the system comprising:

a phase comparator receiving signals indicative of the relative phase of the first and second clock domains, the phase comparator generating a phase signal indicative of whether or not the first clock domain leads the second clock domain;

a state machine receiving the start signal and a clock signal in the first clock domain, the state machine generating the first clock signal at a time subsequent to the start signal so that the first clock signal is generated later when the first clock domain leads the second clock domain than when the first clock domain does not lead the second clock domain wherein the state machine comprises:

a series of sequentially coupled latches that are clocked by the first clock signal, the first latch in the series being coupled to receive the start signal, and the final latch in the series outputting an enable signal responsive to the start signal being clocked through the series of latches;

a bypass circuit coupled to receive the phase signal, the bypass circuit being coupled between an input terminal and an output terminal of one of the latches, the bypass circuit bypassing the latch responsive to the absence of a phase signal indicative of the first clock signal leading the second clock signal; and a logic circuit coupled to receive the first clock signal and the enable signal, the logic circuit having an output terminal on which the output clock signal is generated, the enable signal causing the logic circuit to couple the first clock signal to the output terminal so that the output clock signal is generated responsive to the enable signal.

17. The system of claim 16 further comprising a flip-flop having a set input terminal coupled to receiving the start signal and a reset input terminal coupled to receive a signal from an output terminal of one of the latches, an output terminal of the flip-flop being applied to the input of the first latch of the series.

18. The system of claim 16 wherein the logic circuit comprises:

a synchronizing circuit coupled to receive the first clock signal and an output from one of the latches in the series, the synchronizing circuit being operative to generate an enable clock signal on a transition of the first clock signal subsequent to receiving a signal from the latch to which the synchronizing circuit is coupled responsive to the start signal being clocked to the latch through the series of latches; and a toggle circuit coupled to receive the first clock signal and the clock enable signal, the toggle circuit being operative to toggle responsive to each transition of the first clock signal, the output clock signal being generated at an output terminal of the toggle circuit.

19. The system of claim 18 wherein the logic circuit further comprises an output latch coupled to receive the first clock signal and the output clock signal from the toggle circuit, the output latch being operative to latch the output clock signal on the output terminal of the toggle circuit responsive to each transition of the first clock signal.

20. The system of claim 16 wherein the logic circuit further comprises:

an output circuit having an output terminal, a signal input terminal receiving the output clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the start signal and a reset input terminal coupled to a respective output terminal of at least one of the latches in the series, the flip-flop generating the tristate control signal when the flip-flop is reset.

21. A memory device, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the read data start signal and the read clock signal and generates the second input data clock signal, and wherein the state machine generates the second input data clock signal at a time subsequent to the read data start signal time that is sooner when the internal clock signal leads the read clock signal than when the internal clock signal does not lead the read clock signal, and wherein the state machine comprises:

a series of sequentially coupled latches that are clocked by the read clock signal, the first latch in the series being coupled to receive the read data start signal, and the final latch in the series outputting an enable signal responsive to the read data start signal being clocked through the series of latches;

a bypass circuit coupled to receive the phase signal, the bypass circuit being coupled between an input terminal and an output terminal of one of the latches, the bypass circuit bypassing the latch responsive to a phase signal indicative of the internal clock signal leading the read clock signal; and a logic circuit coupled to receive the read clock signal and the enable signal, the logic circuit having an output terminal on which the second input data clock signal is generated, the enable signal causing the logic circuit to couple the read clock signal to the output terminal so that the second input data clock signal is generated responsive to the enable signal.

22. The memory device of claim 21 further comprising a flip-flop having a set input terminal coupled to receiving the read data start signal and a reset input terminal coupled to receive a signal from an output terminal of one of the latches, an output terminal of the flip-flop being applied to the input of the first latch of the series.

23. The memory device of claim 21 wherein the logic circuit comprises:

a synchronizing circuit coupled to receive the read clock signal and an output from one of the latches in the series, the synchronizing circuit being operative to generate an enable clock signal on a transition of the read clock signal subsequent to receiving a signal from the latch to which the synchronizing circuit is coupled responsive to the read data start signal being clocked to the latch through the series of latches; and a toggle circuit coupled to receive the read clock signal and the clock enable signal, the toggle circuit being operative to toggle responsive to each transition of the read clock signal, the second input data clock signal being generated at an output terminal of the toggle circuit.

24. The memory device of claim 21 wherein the logic circuit further comprises:

an output circuit having an output terminal, a signal input terminal receiving the second input data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the read data start signal and a reset input terminal coupled to a respective output terminal of at least one of the latches in the series, the flip-flop generating the tristate control signal when the flip-flop is reset.

25. A memory device, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the read data start signal and the internal clock signal and generates the first output data clock signal, and wherein the state machine generates the first output data clock signal at a time subsequent to the read data start signal time that is later when the internal clock signal leads the read clock signal than when the internal clock signal does not lead the read clock signal, wherein the state machine comprises:

a series of sequentially coupled latches that are clocked by the internal clock signal, the first latch in the series being coupled to receive the read data start signal, and the final latch in the series outputting an enable signal responsive to the read data start signal being clocked through the series of latches;

a bypass circuit coupled to receive the phase signal, the bypass circuit being coupled between an input terminal and an output terminal of one of the latches, the bypass circuit bypassing the latch responsive to an absence of a phase signal indicative of the internal clock signal leading the read clock signal; and a logic circuit coupled to receive the internal clock signal and the enable signal, the logic circuit having an output terminal on which the first output data clock signal is generated, the enable signal causing the logic circuit to couple the internal clock signal to the output terminal so that the first output data clock signal is generated responsive to the enable signal.

26. The memory device of claim 25 further comprising a flip-flop having a set input terminal coupled to receiving the read data start signal and a reset input terminal coupled to receive a signal from an output terminal of one of the latches, an output terminal of the flip-flop being applied to the input of the first latch of the series.

27. The memory device of claim 25 wherein the logic circuit comprises:

a synchronizing circuit coupled to receive the internal clock signal and an output from one of the latches in the series, the synchronizing circuit being operative to generate an enable clock signal on a transition of the internal clock signal subsequent to receiving a signal from the latch to which the synchronizing circuit is coupled responsive to the read data start signal being clocked to the latch through the series of latches; and a toggle circuit coupled to receive the internal clock signal and the clock enable signal, the toggle circuit being operative to toggle responsive to each transition of the internal clock signal, the second input data clock signal being generated at an output terminal of the toggle circuit.

28. The memory device of claim 25 wherein the logic circuit further comprises:

an output circuit having an output terminal, a signal input terminal receiving the second input data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the read data start signal and a reset input terminal coupled to a respective output terminal of at least one of the latches in the series, the flip-flop generating the tristate control signal when the flip-flop is reset.

29. The memory device of claim 28 wherein the logic circuit further comprises:

an output circuit having an output terminal, a signal input terminal receiving the third output data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the write data start signal and a reset input terminal coupled to a respective output terminal of at least one of the latches in the series, the flip-flop generating the tristate control signal when the flip-flop is reset.

30. A memory device, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the write data start signal and the internal clock signal and generates the third output data clock signal, and wherein the state machine generates the third output data clock signal at a time subsequent to the write data start signal time that is earlier when the write clock signal leads the internal clock signal than when the write clock signal does not lead the internal clock signal, and wherein the state machine comprises:

a series of sequentially coupled latches that are clocked by the internal clock signal, the first latch in the series being coupled to receive the write data start signal, and the final latch in the series outputting an enable signal responsive to the write data start signal being clocked through the series of latches;

a bypass circuit coupled to receive the phase signal, the bypass circuit being coupled between an input terminal and an output terminal of one of the latches, the bypass circuit bypassing the latch responsive to a phase signal indicative of the write clock signal leading the internal clock signal; and a logic circuit coupled to receive the internal clock signal and the enable signal, the logic circuit having an output terminal on which the third output data clock signal is generated, the enable signal causing the logic circuit to couple the internal clock signal to the output terminal so that the third output data clock signal is generated responsive to the enable signal.

31. The memory device of claim 30 further comprising a flip-flop having a set input terminal coupled to receiving the write data start signal and a reset input terminal coupled to receive a signal from an output terminal of one of the latches, an output terminal of the flip-flop being applied to the input of the first latch of the series.

32. The memory device of claim 30 wherein the logic circuit comprises:

a synchronizing circuit coupled to receive the internal clock signal and an output from one of the latches in the series, the synchronizing circuit being operative to generate an enable clock signal on a transition of the internal clock signal subsequent to receiving a signal from the latch to which the synchronizing circuit is coupled responsive to the write data start signal being clocked to the latch through the series of latches; and a toggle circuit coupled to receive the internal clock signal and the clock enable signal, the toggle circuit being operative to toggle responsive to each transition of the internal clock signal, the third output data clock signal being generated at an output terminal of the toggle circuit.

33. A memory device, comprising:
a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;
a memory array coupled to the control circuit, the memory array having a plurality of memory cells to store write data responsive to a first input data clock signal derived from the internal clock signal and to output read data responsive to a first output data clock signal derived from the internal clock signal;
an addressing circuit coupled to the memory array and the control circuit, the addressing circuit to receive addresses from an external source and select a memory cell in the memory array corresponding thereto;
a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;
a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and
a coupling system for generating at least one of the data clock signals, the coupling system comprising:
a phase comparator receiving signals indicative of the relative phase of the internal clock signal and one of the read and write clock signals, the phase comparator generating a phase signal indicative of whether or not the internal clock signal leads the one of the read and write clock signals;
a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the write data start signal and the write clock signal and generates the third input data clock signal, and wherein the state machine generates the third input data clock signal at a time subsequent to the write data start signal time that is later when the write clock leads the internal clock signal than when the write clock signal does not lead the internal clock signal, and wherein the state machine comprises:
a series of sequentially coupled latches that are clocked by the write clock signal, the first latch in the series being coupled to receive the write data start signal, and the final latch in the series outputting an enable signal responsive to the write data start signal being clocked through the series of latches;
a bypass circuit coupled to receive the phase signal, the bypass circuit being coupled between an input terminal and an output terminal of one of the latches, the bypass circuit bypassing the latch responsive to an absence of the phase signal indicative of the write clock signal leading the internal clock signal; and
a logic circuit coupled to receive the write clock signal and the enable signal, the logic circuit having an output terminal on which the third input data clock signal is generated, the enable signal causing the logic circuit to couple the write clock signal to the output terminal so that the third input data clock signal is generated responsive to the enable signal.

34. The memory device of claim 33 further comprising a flip-flop having a set input terminal coupled to receiving the write data start signal and a reset input terminal coupled to receive a signal from an output terminal of one of the latches, an output terminal of the flip-flop being applied to the input of the first latch of the series.

35. The memory device of claim 33 wherein the logic circuit comprises:
a synchronizing circuit coupled to receive the write clock signal and an output from one of the latches in the series, the synchronizing circuit being operative to generate an enable clock signal on a transition of the write clock signal subsequent to receiving a signal from the latch to which the synchronizing circuit is coupled responsive to the write data start signal being clocked to the latch through the series of latches; and
a toggle circuit coupled to receive the write clock signal and the clock enable signal, the toggle circuit being operative to toggle responsive to each transition of the write clock signal, the third input data clock signal being generated at an output terminal of the toggle circuit.

36. The memory device of claim 33 wherein the logic circuit further comprises:
an output circuit having an output terminal, a signal input terminal receiving the third input data clock signal, and a tristate input terminal adapted to receive a tristate control signal, the output circuit being operative to place the output terminal at a high impedance responsive to the tristate control signal and to otherwise couple the signal input terminal to the output terminal; and
a flip-flop having a set input terminal coupled to receive the write data start signal and a reset input terminal coupled to a respective output terminal of at least one of the latches in the series, the flip-flop generating the tristate control signal when the flip-flop is reset.

37. A computer system, comprising:
a processor having a processor bus;
an input device coupled to the processor through the processor bus and to allow data to be entered into the computer system;
an output device coupled to the processor through the processor bus to allow data to be output from the computer system;
a memory controller coupled to the processor through the processor bus; and a memory device coupled to the processor through the processor bus, comprising:
a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;
a memory array coupled to the control circuit, the memory array having a plurality of memory cells to store write data responsive to a first input data clock signal derived from the internal clock signal and to output read data responsive to a first output data clock signal derived from the internal clock signal;
an addressing circuit coupled to the memory array and the control circuit, the addressing circuit to receive addresses from an external source and select a memory cell in the memory array corresponding thereto; a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;
a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and
a coupling system for generating at least one of the data clock signals, the coupling system comprising:
a phase comparator receiving signals indicative of the relative phase of the internal clock signal and one of the read and write clock signals, the phase comparator generating a phase signal indicative of whether or not the internal clock signal leads the one of the read and write clock signals;
a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the read data start signal and the read clock signal and generates the second input data clock signal, and wherein the state machine generates the second input data clock signal at a time subsequent to the read data start signal time that is sooner when the internal clock signal leads the read clock signal than when the internal clock signal does not lead the read clock signal, and wherein the state machine comprises:
a series of sequentially coupled latches that are clocked by the read clock signal, the first latch in the series being coupled to receive the read data start signal, and the final latch in the series outputting an enable signal responsive to the read data start signal being clocked through the series of latches;
a bypass circuit coupled to receive the phase signal, the bypass circuit being coupled between an input terminal and an output terminal of one of the latches, the bypass circuit bypassing the latch responsive to a phase signal indicative of the internal clock signal leading the read clock signal; and
a logic circuit coupled to receive the read clock signal and the enable signal, the logic circuit having an output terminal on which the second input data clock signal is generated, the enable signal causing the logic circuit to couple the read clock signal to the output terminal so that the second input data clock signal is generated responsive to the enable signal.

38. The computer system of claim 37 further comprising a flip-flop having a set input terminal coupled to receiving the read data start signal and a reset input terminal coupled to receive a signal from an output terminal of one of the latches, an output terminal of the flip-flop being applied to the input of the first latch of the series.

39. The computer system of claim 37 wherein the logic circuit comprises:
a synchronizing circuit coupled to receive the read clock signal and an output from one of the latches in the series, the synchronizing circuit being operative to generate an enable clock signal on a transition of the read clock signal subsequent to receiving a signal from the latch to which the synchronizing circuit is coupled responsive to the read data start signal being clocked to the latch through the series of latches; and
a toggle circuit coupled to receive the read clock signal and the clock enable signal, the toggle circuit being operative to toggle responsive to each transition of the read clock signal, the second input data clock signal being generated at an output terminal of the toggle circuit.

40. The computer system of claim 37 wherein the logic circuit further comprises:
an output circuit having an output terminal, a signal input terminal receiving the second input data clock signal, and a tristate input terminal adapted to receive a tristate control signal, the output circuit being operative to place the output terminal at a high impedance responsive to the tristate control signal and to otherwise couple the signal input terminal to the output terminal; and
a flip-flop having a set input terminal coupled to receive the read data start signal and a reset input terminal coupled to a respective output terminal of at least one of the latches in the series, the flip-flop generating the tristate control signal when the flip-flop is reset.

41. A computer system, comprising:
a processor having a processor bus;
an input device coupled to the processor through the processor bus and to allow data to be entered into the computer system;
an output device coupled to the processor through the processor bus to allow data to be output from the computer system;

a memory controller coupled to the processor through the processor bus; and a memory device coupled to the processor through the processor bus, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the read data start signal and the internal clock signal and generates the first output data clock signal, and wherein the state machine generates the first output data clock signal at a time subsequent to the read data start signal time that is later when the internal clock signal leads the read clock signal than when the internal clock signal does not lead the read clock signal, and wherein the state machine comprises:

a series of sequentially coupled latches that are clocked by the internal clock signal, the first latch in the series being coupled to receive the read data start signal, and the final latch in the series outputting an enable signal responsive to the read data start signal being clocked through the series of latches;

a bypass circuit coupled to receive the phase signal, the bypass circuit being coupled between an input terminal and an output terminal of one of the latches, the bypass circuit bypassing the latch responsive to the absence of a phase signal indicative of the internal clock signal leading the read clock signal; and a logic circuit coupled to receive the internal clock signal and the enable signal, the logic circuit having an output terminal on which the first output data clock signal is generated, the enable signal causing the logic circuit to couple the internal clock signal to the output terminal so that the first output data clock signal is generated responsive to the enable signal.

42. The computer system of claim 41 further comprising a flip-flop having a set input terminal coupled to receiving the read data start signal and a reset input terminal coupled to receive a signal from an output terminal of one of the latches, an output terminal of the flip-flop being applied to the input of the first latch of the series.

43. The computer system of claim 41 wherein the logic circuit comprises:

a synchronizing circuit coupled to receive the internal clock signal and an output from one of the latches in the series, the synchronizing circuit being operative to generate an enable clock signal on a transition of the internal clock signal subsequent to receiving a signal from the latch to which the synchronizing circuit is coupled responsive to the read data start signal being clocked to the latch through the series of latches; and a toggle circuit coupled to receive the internal clock signal and the clock enable signal, the toggle circuit being operative to toggle responsive to each transition of the internal clock signal, the second input data clock signal being generated at an output terminal of the toggle circuit.

44. The computer system of claim 41 wherein the logic circuit further comprises:

an output circuit having an output terminal, a signal input terminal receiving the second input data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the read data start signal and a reset input terminal coupled to a respective output terminal of at least one of the latches in the series, the flip-flop generating the tristate control signal when the flip-flop is reset.

45. A computer system, comprising:

a processor having a processor bus;

an input device coupled to the processor through the processor bus and to allow data to be entered into the computer system;

an output device coupled to the processor through the processor bus to allow data to be output from the computer system;

a memory controller coupled to the processor through the processor bus; and a memory device coupled to the processor through the processor bus, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit further generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the write data start signal and the internal clock signal and generates the third output data clock signal, and wherein the state machine generates the third output data clock signal at a time subsequent to the write data start signal time that is earlier when the write clock signal leads the internal clock signal than when the write clock signal does not lead the internal clock signal, and wherein the state machine comprises:

a series of sequentially coupled latches that are clocked by the internal clock signal, the first latch in the series being coupled to receive the write data start signal, and the final latch in the series outputting an enable signal responsive to the write data start signal being clocked through the series of latches;

a bypass circuit coupled to receive the phase signal, the bypass circuit being coupled between an input terminal and an output terminal of one of the latches, the bypass circuit bypassing the latch responsive to a phase signal indicative of the write clock signal leading the internal clock signal; and a logic circuit coupled to receive the internal clock signal and the enable signal, the logic circuit having an output terminal on which the third output data clock signal is generated, the enable signal causing the logic circuit to couple the internal clock signal to the output terminal so that the third output data clock signal is generated responsive to the enable signal.

46. The computer system of claim 45 further comprising a flip-flop having a set input terminal coupled to receiving the write data start signal and a reset input terminal coupled to receive a signal from an output terminal of one of the latches, an output terminal of the flip-flop being applied to the input of the first latch of the series.

47. The computer system of claim 45 wherein the logic circuit comprises:

a synchronizing circuit coupled to receive the internal clock signal and an output from one of the latches in the series, the synchronizing circuit being operative to generate an enable clock signal on a transition of the internal clock signal subsequent to receiving a signal from the latch to which the synchronizing circuit is coupled responsive to the write data start signal being clocked to the latch through the series of latches; and a toggle circuit coupled to receive the internal clock signal and the clock enable signal, the toggle circuit being operative to toggle responsive to each transition of the internal clock signal, the third output data clock signal being generated at an output terminal of the toggle circuit.

48. The computer system of claim 45 wherein the logic circuit further comprises:

an output circuit having an output terminal, a signal input terminal receiving the third output data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the write data start signal and a reset input terminal coupled to a respective output terminal of at least one of the latches in the series, the flip-flop generating the tristate control signal when the flip-flop is reset.

49. A computer system, comprising:

a processor having a processor bus;

an input device coupled to the processor through the processor bus and to allow data to be entered into the computer system;

an output device coupled to the processor through the processor bus to allow data to be output from the computer system;

a memory controller coupled to the processor through the processor bus; and a memory device coupled to the processor through the processor bus, comprising:

a control circuit to receive a command from an external source and generate control signals responsive thereto, the control circuit including a clock generator circuit to receive at least one external clock signal and to generate an internal clock signal, a read clock signal, and a write clock signal in which the internal clock signal, read clock signal, and write clock signal may be in different clock domains, the control circuit farther generating a read data start signal to initiate transfer of data from the memory device and a write data start signal to initiate transfer of data to the memory device;

a memory array coupled to the control circuit, the memory array having a plurality of memory cells to store write data responsive to a first input data clock signal derived from the internal clock signal and to output read data responsive to a first output data clock signal derived from the internal clock signal;

an addressing circuit coupled to the memory array and the control circuit, the addressing circuit to receive addresses from an external source and select a memory cell in the memory array corresponding thereto;

a read data path having a read register coupled to the control circuit, the read register to receive read data from the memory array responsive to a second input data clock signal derived from the read clock signal, and to couple the read data to an externally accessible terminal responsive to a second output data clock signal derived from the read clock signal, at least one of the data clock signals being generated subsequent to the read data start signal;

a write data path having a write register coupled to the control circuit, the write register to receive write data from an externally accessible terminal responsive to a third input data clock signal derived from the write clock signal, and to couple the write data to the memory array responsive to a third output data clock signal derived from the internal clock signal, at least one of the data clock signals being generated subsequent to the write data start signal; and a coupling system for generating at least one of the data clock signals, the coupling system comprising:

a phase comparator receiving signals indicative of the relative phase of the internal clock signal and one of the read and write clock signals, the phase comparator generating a phase signal indicative of whether or not the internal clock signal leads the one of the read and write clock signals;

a state machine receiving one of the start signals, the internal clock signal, and one of the read or write clock signals, the state machine generating one of the data clock signals from one of the internal, read, or write clock signals, the data clock signal being generated at a time subsequent to the start signal as a function of whether or not the internal clock signal leads the read or write clock signal received by the state machine, wherein the state machine receives the write data start signal and the write clock signal and generates the third input data clock signal, and wherein the state machine generates the third input data clock signal at a time subsequent to the write data start signal time that is later when the write clock leads the internal clock signal than when the write clock signal does not lead the internal clock signal, and wherein the state machine comprises:

a series of sequentially coupled latches that are clocked by the write clock signal, the first latch in the series being coupled to receive the write data start signal, and the final latch in the series outputting an enable signal responsive to the write data start signal being clocked through the series of latches;

a bypass circuit coupled to receive the phase signal, the bypass circuit being coupled between an input terminal and an output terminal of one of the latches, the bypass circuit bypassing the latch responsive to an absence of the phase signal indicative of the write clock signal leading the internal clock signal; and a logic circuit coupled to receive the write clock signal and the enable signal, the logic circuit having an output terminal on which the third input data clock signal is generated, the enable signal causing the logic circuit to couple the write clock signal to the output terminal so that the third input data clock signal is generated responsive to the enable signal.

50. The computer system of claim 49 further comprising a flip-flop having a set input terminal coupled to receiving the write data start signal and a reset input terminal coupled to receive a signal from an output terminal of one of the latches, an output terminal of the flip-flop being applied to the input of the first latch of the series.

51. The computer system of claim 49 wherein the logic circuit comprises:

a synchronizing circuit coupled to receive the write clock signal and an output from one of the latches in the series, the synchronizing circuit being operative to generate an enable clock signal on a transition of the write clock signal subsequent to receiving a signal from the latch to which the synchronizing circuit is coupled responsive to the write data start signal being clocked to the latch through the series of latches; and a toggle circuit coupled to receive the write clock signal and the clock enable signal, the toggle circuit being operative to toggle responsive to each transition of the write clock signal, the third input data clock signal being generated at an output terminal of the toggle circuit.

52. The computer system of claim 49 wherein the logic circuit further comprises:

an output circuit having an output terminal, a signal input terminal receiving the third input data clock signal, and a tristate input terminal adapted to receive a tristate control signal, the output circuit being operative to place the output terminal at a high impedance responsive to the tristate control signal and to otherwise couple the signal input terminal to the output terminal; and a flip-flop having a set input terminal coupled to receive the write data start signal and a reset input terminal coupled to a respective output terminal of at least one of the latches in the series, the flip-flop generating the tristate control signal when the flip-flop is reset.

53. A method of coupling a signal through a circuit responsive to a start signal, comprising:

generating the start signal;

clocking the signal into the circuit using a first clock signal operating in a first clock domain, the signal being clocked into the circuit a first number of transitions of the first clock signal after start signal;

clocking the signal out of the circuit using a second clock signal operating in a second clock domain, the signal being clocked out of the circuit a second number of transitions of the second clock signal after start signal;

determining whether the first clock signal leads the second clock signal; and altering either the first number of transitions or the second number of transitions depending on whether or not the first clock signal leads the second clock signal, wherein the act of altering the second number of transitions comprises:

coupling a predetermined logic level through a series of latches responsive to a clock signal that is synchronized to the second clock signal;

generating the second clock signal after the logic level has been clocked through a first plurality of latches;

terminating the second clock signal after the logic level has been clocked through a second plurality of latches that is greater in number than the first plurality of latches; and increasing the first and second plurality of latches by one if the first clock signal does not lead the second clock signal.

54. In a packetized dynamic random access memory ("DRAM") having a plurality of memory arrays from which read data is output responsive to an internal clock signal operating in one clock domain, the packetized DRAM further including a read buffer coupled to the memory arrays to which read data is transferred responsive to a data clock signal operating in a different clock domain, a method of transferring the read data from the memory arrays to the read buffer, comprising:

clocking the read data out of the memory arrays responsive to the internal clock signal;

clocking the read data into the read buffer responsive to the data clock signal;

determining whether the internal clock signal leads the data clock signal; and adjusting a delay period between clocking the read data out of the memory arrays and clocking the read data into the read buffer, the delay period when the internal clock signal leads the data clock signal being shorter than when the internal clock signal does not lead the data clock signal, wherein the act of adjusting the delay period between clocking the read data out of the memory arrays and clocking the read data into the read buffer, comprises:

clocking the read data into the read buffer responsive to each transition of the data clock signal after a first predetermined number of data clock signal transitions have occurred if the internal clock signal leads the data clock signal; and clocking the read data into the read buffer responsive to each transition of the data clock signal after a second predetermined number of data clock signal transitions have occurred if the internal clock signal does not lead the data clock signal, the second predetermined number of data clock signal transitions being greater than the first predetermined number of data clock signal transitions.

55. In a packetized dynamic random access memory ("DRAM") having a read buffer into which read data is clocked responsive to a data clock signal operating in one clock domain and out of which read data is clocked responsive to a read clock signal operating in a different clock domain, a method of transferring the read data through the read buffer, comprising:

clocking the read data into the read buffer responsive to the data clock signal;

clocking the read out of the read buffer responsive to the read clock signal;

determining whether the data clock signal leads the read clock signal; and adjusting a delay period between clocking the read data into the read buffer and clocking the read data out of the read buffer, the delay period when the data clock signal leads the read clock signal being shorter than when the data clock signal does not lead the read clock signal, wherein the act of adjusting the delay period between clocking the read data into the read buffer and clocking the read data out of the read buffer, comprises:

clocking the read data into the read buffer responsive to each transition of the data clock signal after a first predetermined number of data clock signal transitions have occurred if the data clock signal leads the read clock signal; and clocking the read data into the read buffer responsive to each transition of the data clock signal after a second predetermined number of data clock signal transitions have occurred if the data clock signal does not lead the read clock signal, the second predetermined number of data clock signal transitions being smaller than the first predetermined number of data clock signal transitions.

56. The method of claim 55 wherein the act of adjusting the delay period between clocking the read data into the read buffer and clocking the read data out of the read buffer, comprises:

clocking the read data out of the read buffer responsive to each transition of the read clock signal after a first predetermined number of read clock signal transitions have occurred if the data clock signal leads the read clock signal; and clocking the read data out of the read buffer responsive to each transition of the read clock signal after a second predetermined number of read clock signal transitions have occurred if the data clock signal does not lead the read clock signal, the second predetermined number of read clock signal transitions being greater than the first predetermined number of read clock signal transitions.

57. In a packetized dynamic random access memory ("DRAM") having a write buffer into which write data is clocked responsive to a first clock signal operating in one clock domain and out of which write data is clocked responsive to a write clock signal operating in a different clock domain, a method of transferring the write data through the write buffer, comprising:

clocking the write data into the write buffer responsive to the first clock signal;

clocking the write out of the write buffer responsive to the write clock signal;

determining whether the first clock signal leads the write clock signal; and adjusting a delay period between clocking the write data into the write buffer and clocking the write data out of the write buffer, the delay period when the first clock signal leads the write clock signal being shorter than when the first clock signal does not lead the write clock signal, wherein the act of adjusting the delay period between clocking the write data into the write buffer and clocking the write data out of the write buffer, comprises:

clocking the write data into the write buffer responsive to each transition of the first clock signal after a first predetermined number of first clock signal transitions have occurred if the first clock signal leads the write clock signal; and clocking the write data into the write buffer responsive to each transition of the first clock signal after a second predetermined number of first clock signal transitions have occurred if the first clock signal does not lead the write clock signal, the second predetermined number of first clock signal transitions being smaller than the first predetermined number of first clock signal transitions.

58. The method of claim 57 wherein the act of adjusting the delay period between clocking the write data into the write buffer and clocking the write data out of the write buffer, comprises:

clocking the write data out of the write buffer responsive to each transition of the write clock signal after a first predetermined number of write clock signal transitions have occurred if the first clock signal leads the write clock signal; and clocking the write data out of the write buffer responsive to each transition of the write clock signal after a second predetermined number of write clock signal transitions have occurred if the first clock signal does not lead the write clock signal, the second predetermined number of write clock signal transitions being greater than the first predetermined number of write clock signal transitions.

\* \* \* \* \*